(12) United States Patent
Johnson et al.

(10) Patent No.: US 10,162,359 B2
(45) Date of Patent: Dec. 25, 2018

(54) AUTONOMOUS COVERAGE ROBOT

(71) Applicant: iRobot Corporation, Bedford, MA (US)

(72) Inventors: Joseph M. Johnson, Norwood, MA (US); Christopher John Morse, Malden, MA (US); Marcus Williams, Newton, MA (US)

(73) Assignee: iRobot Corporation, Bedford, MA (US)

( * ) Notice: Subject to any disclaimer, the term of this patent is extended or adjusted under 35 U.S.C. 154(b) by 88 days.

(21) Appl. No.: 15/284,853

(22) Filed: Oct. 4, 2016

(65) Prior Publication Data

US 2017/0023942 A1    Jan. 26, 2017

Related U.S. Application Data

(63) Continuation of application No. 13/729,894, filed on Dec. 28, 2012, now Pat. No. 9,483,055.

(51) Int. Cl.
*G05D 1/02* (2006.01)
*G05D 1/00* (2006.01)

(52) U.S. Cl.
CPC .......... *G05D 1/024* (2013.01); *G05D 1/0027* (2013.01); *G05D 1/0227* (2013.01);
(Continued)

(58) Field of Classification Search
CPC ................ G05D 1/024; G05D 1/0242; G05D 2201/0203; Y01S 901/01; A47L 2201/04
See application file for complete search history.

(56) References Cited

U.S. PATENT DOCUMENTS 2,930,055 A    3/1960    Fallen et al.
3,638,356 A    2/1972    La Branche
(Continued)

FOREIGN PATENT DOCUMENTS

CN    1401289    3/2003
CN    1586693    3/2005
(Continued)

OTHER PUBLICATIONS

Supplementary European Search Report in International Application No. 16203680.0, dated Feb. 2, 2017, 5 pages.
(Continued)

*Primary Examiner* — Yonel Beaulieu
*Assistant Examiner* — Martin A Weeks
(74) *Attorney, Agent, or Firm* — Fish & Richardson P.C.

(57) ABSTRACT

A mobile robot that includes a robot body having a forward drive direction, a drive system supporting the robot body above a cleaning surface for maneuvering the robot across the cleaning surface, and a robot controller in communication with the drive system. The robot also includes a bumper movably supported by a forward portion of the robot body and a obstacle sensor system disposed on the bumper. The obstacle sensor system includes at least one contact sensor disposed on the bumper, at least one proximity sensor disposed on the bumper and a auxiliary circuit board disposed on the bumper and in communication with the at least one contact sensor, the at least one proximity sensor, and the robot controller.

25 Claims, 24 Drawing Sheets

(52) U.S. Cl.
CPC ........ *G05D 1/0242* (2013.01); *A47L 2201/04* (2013.01); *G05D 2201/0203* (2013.01); *Y10S 901/01* (2013.01)

(56) References Cited

U.S. PATENT DOCUMENTS

| | | | |
|---|---|---|---|
| 3,690,559 A | 9/1972 | Rudloff | |
| 4,044,422 A | 8/1977 | Larsen | |
| 4,305,234 A | 12/1981 | Pichelman | |
| 4,306,329 A | 12/1981 | Yokoi | |
| 4,359,801 A | 11/1982 | Tale | |
| 4,709,771 A | 12/1987 | Basham et al. | |
| 4,712,740 A | 12/1987 | Duncan et al. | |
| 4,756,049 A | 7/1988 | Uehara | |
| 4,807,327 A | 2/1989 | Jajko et al. | |
| 4,967,862 A | 11/1990 | Pong et al. | |
| 5,086,535 A | 2/1992 | Grossmeyer et al. | |
| 5,127,128 A | 7/1992 | Lee | |
| 5,222,786 A | 6/1993 | Sovis et al. | |
| 5,279,672 A | 1/1994 | Betker et al. | |
| 5,293,955 A | 3/1994 | Lee | |
| 5,341,540 A | 8/1994 | Soupert et al. | |
| 5,411,716 A | 5/1995 | Thomas et al. | |
| 5,427,262 A | 6/1995 | Hanson et al. | |
| 5,440,216 A | 8/1995 | Kim | |
| 5,709,007 A | 1/1998 | Chiang | |
| 5,787,545 A | 8/1998 | Colens | |
| 5,815,880 A | 10/1998 | Nakanishi | |
| 5,852,847 A | 12/1998 | Weiss et al. | |
| 5,884,359 A | 3/1999 | Libhart | |
| 5,894,621 A | 4/1999 | Kubo | |
| 5,940,927 A | 8/1999 | Haegermarck et al. | |
| 5,959,424 A | 9/1999 | Elkmann et al. | |
| 5,998,953 A | 12/1999 | Nakamura et al. | |
| 6,009,594 A | 1/2000 | Grey | |
| 6,076,226 A | 6/2000 | Reed | |
| 6,124,694 A | 9/2000 | Bancroft et al. | |
| 6,227,946 B1 | 5/2001 | Gonzalez-Martin et al. | |
| 6,276,378 B1 | 8/2001 | Taniyama et al. | |
| 6,389,329 B1 | 5/2002 | Colens | |
| 6,459,955 B1 | 10/2002 | Bartsch et al. | |
| 6,481,515 B1 | 11/2002 | Kirkpatrick et al. | |
| 6,532,404 B2 | 3/2003 | Colens | |
| 6,594,844 B2 | 7/2003 | Jones | |
| 6,601,265 B1 | 8/2003 | Burlington | |
| 6,615,434 B1 | 9/2003 | Davis et al. | |
| 6,633,150 B1 | 10/2003 | Wallach et al. | |
| 6,690,134 B1 | 2/2004 | Jones et al. | |
| 6,781,338 B2 | 8/2004 | Jones et al. | |
| 6,809,490 B2 | 10/2004 | Jones et al. | |
| 6,810,305 B2 | 10/2004 | Kirkpatrick | |
| 6,810,350 B2 | 10/2004 | Blakley | |
| 6,848,146 B2 | 2/2005 | Wright et al. | |
| 6,854,148 B1 | 2/2005 | Rief et al. | |
| 6,883,201 B2 | 4/2005 | Jones et al. | |
| 6,941,199 B1 | 9/2005 | Bottomley et al. | |
| 6,965,209 B2 | 11/2005 | Jones et al. | |
| 7,059,012 B2 | 6/2006 | Song et al. | |
| 7,079,923 B2 | 7/2006 | Abramson et al. | |
| 7,113,847 B2 | 9/2006 | Chmura et al. | |
| 7,155,308 B2 | 12/2006 | Jones | |
| 7,167,775 B2 | 1/2007 | Abramson et al. | |
| 7,173,391 B2 | 2/2007 | Jones et al. | |
| 7,196,487 B2 | 3/2007 | Jones et al. | |
| 7,321,807 B2 | 1/2008 | Laski | |
| 7,346,428 B1 | 3/2008 | Huffman et al. | |
| 7,388,343 B2 | 6/2008 | Jones et al. | |
| 7,389,156 B2 | 6/2008 | Ziegler et al. | |
| 7,418,762 B2 | 9/2008 | Arai et al. | |
| 7,448,113 B2 | 11/2008 | Jones et al. | |
| 7,571,511 B2 | 8/2009 | Jones et al. | |
| 7,611,583 B2 | 11/2009 | Buckley et al. | |
| 7,636,982 B2 | 12/2009 | Jones et al. | |
| 7,761,954 B2 | 7/2010 | Ziegler et al. | |
| 7,784,147 B2 | 8/2010 | Burkholder et al. | |
| 8,392,021 B2 | 3/2013 | Konandreas et al. | |
| 2001/0013434 A1 | 8/2001 | Hopkins | |
| 2002/0016649 A1 | 2/2002 | Jones | |
| 2002/0050907 A1* | 5/2002 | Szu-Lu | H01F 27/292 336/192 |
| 2002/0112742 A1 | 8/2002 | Bredo et al. | |
| 2002/0120364 A1 | 8/2002 | Colens | |
| 2003/0019071 A1 | 1/2003 | Field et al. | |
| 2003/0025472 A1 | 2/2003 | Jones et al. | |
| 2003/0108395 A1 | 6/2003 | Douglas et al. | |
| 2003/0192144 A1 | 10/2003 | Song et al. | |
| 2003/0229421 A1 | 12/2003 | Chmura et al. | |
| 2004/0049877 A1 | 3/2004 | Jones et al. | |
| 2004/0049878 A1 | 3/2004 | Thomas et al. | |
| 2004/0187249 A1 | 9/2004 | Jones et al. | |
| 2004/0187457 A1 | 9/2004 | Colens | |
| 2004/0207355 A1 | 10/2004 | Jones et al. | |
| 2005/0010331 A1 | 1/2005 | Taylor et al. | |
| 2005/0015913 A1 | 1/2005 | Kim et al. | |
| 2005/0015915 A1 | 1/2005 | Thomas et al. | |
| 2005/0028316 A1 | 2/2005 | Thomas et al. | |
| 2005/0029029 A1 | 2/2005 | Thorne | |
| 2005/0055796 A1 | 3/2005 | Wright et al. | |
| 2005/0067994 A1 | 3/2005 | Jones et al. | |
| 2005/0081782 A1 | 4/2005 | Buckley et al. | |
| 2005/0091782 A1 | 5/2005 | Gordon et al. | |
| 2005/0091786 A1 | 5/2005 | Wright et al. | |
| 2005/0190291 A1 | 9/2005 | Kota et al. | |
| 2005/0192727 A1 | 9/2005 | Shostak et al. | |
| 2005/0204717 A1 | 9/2005 | Colens | |
| 2005/0217061 A1 | 10/2005 | Reindle | |
| 2005/0229340 A1 | 10/2005 | Sawalski et al. | |
| 2006/0025897 A1 | 2/2006 | Shostak et al. | |
| 2006/0084861 A1* | 4/2006 | Blank | A61B 5/02007 600/423 |
| 2006/0107894 A1 | 5/2006 | Buckley et al. | |
| 2006/0150361 A1 | 7/2006 | Aldred et al. | |
| 2006/0184293 A1 | 8/2006 | Konandreas et al. | |
| 2006/0190146 A1 | 8/2006 | Morse et al. | |
| 2006/0278161 A1 | 12/2006 | Burkholder et al. | |
| 2007/0142964 A1 | 6/2007 | Abramson | |
| 2007/0261193 A1 | 11/2007 | Gordon et al. | |
| 2007/0266508 A1 | 11/2007 | Jones et al. | |
| 2008/0140255 A1 | 6/2008 | Ziegler et al. | |
| 2008/0155768 A1 | 7/2008 | Ziegler et al. | |
| 2008/0184518 A1 | 8/2008 | Taylor et al. | |
| 2008/0276407 A1* | 11/2008 | Schnittman | A47L 11/34 15/319 |
| 2008/0281470 A1* | 11/2008 | Gilbert, Jr. | A47L 11/34 700/259 |
| 2008/0307590 A1 | 12/2008 | Jones et al. | |
| 2009/0055019 A1* | 2/2009 | Stiehl | B25J 9/1671 700/249 |
| 2010/0006028 A1 | 1/2010 | Buckley et al. | |
| 2010/0049365 A1 | 2/2010 | Jones et al. | |
| 2010/0207754 A1 | 8/2010 | Shostak et al. | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2011/0095752 A1 | 4/2011 | Short et al. | |
| 2012/0011668 A1* | 1/2012 | Schnittman | A47L 11/34 15/49.1 |
| 2012/0167917 A1* | 7/2012 | Gilbert, Jr. | A47L 11/408 134/6 |
| 2012/0173070 A1* | 7/2012 | Schnittman | G05D 1/0227 701/26 |
| 2014/0188325 A1 | 7/2014 | Johnson et al. | |

FOREIGN PATENT DOCUMENTS

| | | |
|---|---|---|
| EP | 1711873 | 10/2006 |
| EP | 2243412 | 10/2010 |
| EP | 2546714 | 1/2013 |
| JP | 2003275157 | 9/2003 |
| JP | 2004259481 | 9/2004 |
| JP | 2006043071 | 2/2006 |
| JP | 2006215914 | 8/2006 |

(56) References Cited

FOREIGN PATENT DOCUMENTS

| JP | 2007037713 | 2/2007 |
|---|---|---|
| JP | 2011200742 | 10/2011 |
| JP | 2012178162 | 9/2012 |

OTHER PUBLICATIONS

International Search Report and Written Opinion of WO Application No. PCT/US2013/057318, dated Nov. 22, 2013.
Luo. "Real-Time Area Covering Operations with Obstacle Avoidance for Cleaning Robots," 2002, IEEE, p. 2359-2364.
Tribelhorn et al,, "Evaluating the Roomba: A Low-Cost, Ubiquitous Platform for Robotics Research and Education," 2007, IEEE, p. 1393-1399.
Examination Report for Australian Application No. 2013368461 dated Feb. 19, 2015.
Office Action for Canadian Application No. 2871723 dated Jun. 16, 2015.
Office Action for Japanese Application No. 2015-511816 dated Jul. 1, 2015 with English translation thereof.
European Search Report for EP Application No. 13868349.5 dated May 11, 2015.
European Search Report for European Patent Application No. 17202297.2, dated Jun. 26, 2018, 4 pages.

\* cited by examiner

AUTONOMOUS COVERAGE ROBOT

CROSS-REFERENCE TO RELATED APPLICATIONS

This application is a continuation application of and claims priority to U.S. Pat. No. 9,483,055, filed on Dec. 28, 2012.

TECHNICAL FIELD

This disclosure relates to autonomous coverage robots.

BACKGROUND

Wet cleaning of household surfaces has long been done manually using a wet mop or sponge. The mop or sponge is dipped into a container filled with a cleaning fluid to allow the mop or sponge to absorb an amount of the cleaning fluid. The mop or sponge is then moved over the surface to apply a cleaning fluid onto the surface. The cleaning fluid interacts with contaminants on the surface and may dissolve or otherwise emulsify contaminants into the cleaning fluid. The cleaning fluid is therefore transformed into a waste liquid that includes the cleaning fluid and contaminants held in suspension within the cleaning fluid. Thereafter, the sponge or mop is used to absorb the waste liquid from the surface. While clean water is somewhat effective for use as a cleaning fluid applied to household surfaces, cleaning is typically done with a cleaning fluid that is a mixture of clean water and soap or detergent that reacts with contaminants to emulsify the contaminants into the water.

The sponge or mop may be used as a scrubbing element for scrubbing the floor surface, and especially in areas where contaminants are particularly difficult to remove from the household surface. The scrubbing action serves to agitate the cleaning fluid for mixing with contaminants as well as to apply a friction force for loosening contaminants from the floor surface. Agitation enhances the dissolving and emulsifying action of the cleaning fluid and the friction force helps to break bonds between the surface and contaminants.

After cleaning an area of the floor surface, the waste liquid is rinsed from the mop or sponge. This is typically done by dipping the mop or sponge back into the container filled with cleaning fluid. The rinsing step contaminates the cleaning fluid with waste liquid and the cleaning fluid becomes more contaminated each time the mop or sponge is rinsed. As a result, the effectiveness of the cleaning fluid deteriorates as more of the floor surface area is cleaned.

Some manual floor cleaning devices have a handle with a cleaning fluid supply container supported on the handle and a scrubbing sponge at one end of the handle. These devices include a cleaning fluid dispensing nozzle supported on the handle for spraying cleaning fluid onto the floor. These devices also include a mechanical device for wringing waste liquid out of the scrubbing sponge and into a waste container.

Manual methods of cleaning floors can be labor intensive and time consuming. Thus, in many large buildings, such as hospitals, large retail stores, cafeterias, and the like, floors are wet cleaned on a daily or nightly basis. Industrial floor cleaning "robots" capable of wet cleaning floors have been developed. To implement wet cleaning techniques required in large industrial areas, these robots are typically large, costly, and complex. These robots have a drive assembly that provides a motive force to autonomously move the wet cleaning device along a cleaning path. However, because these industrial-sized wet cleaning devices weigh hundreds of pounds, these devices are usually attended by an operator. For example, an operator can turn off the device and, thus, avoid significant damage that can arise in the event of a sensor failure or an unanticipated control variable. As another example, an operator can assist in moving the wet cleaning device to physically escape or navigate among confined areas or obstacles.

SUMMARY

One aspect of the disclosure provides a mobile robot that includes a robot body having a forward drive direction, a drive system supporting the robot body above a floor surface for maneuvering the robot across the floor surface, and a main circuit board in communication with the drive system. The robot also includes a bumper frame supported by the robot body and defining a shape complimentary of a front periphery of the robot body. An obstacle sensor system disposed on the bumper frame includes a multiplexing auxiliary circuit board supported by the bumper frame. The auxiliary circuit board includes a computing processor and memory. The computing processor is capable of executing instructions stored on the memory. The obstacle sensor system includes an array of proximity sensors distributed along the bumper frame. Each proximity sensor has at least two wires collected in at least one wire collector, which is connected to the auxiliary circuit board. The obstacle sensor system also includes a serial communication line connecting the auxiliary circuit board to the main circuit board, the communication line having fewer than half the number of wires connecting the proximity sensor array to the auxiliary circuit board.

Implementations of the disclosure may include one or more of the following features. In some implementations, at least one proximity sensor includes a pair of converging infrared emitter-sensor elements, a sonar sensor, an ultrasonic sensor, a three-dimensional volumetric point cloud imaging device, or a contact sensor. In some examples, each proximity sensor includes an infrared emitter having an emission field and an infrared detector having a detection field. The infrared emitter and the infrared detector are arranged so that the emission field overlaps with the detection field.

In some implementations, the array of proximity sensors includes an array of wall proximity sensors disposed evenly along a forward perimeter of the bumper frame. Each wall proximity sensor is directed outward substantially parallel to the floor surface.

The obstacle sensor system may include an array of cliff proximity sensors distributed along the bumper frame and disposed forward of wheels of the drive system. Each cliff proximity sensor is directed downward at the floor surface for detecting a falling edge of the floor surface. Moreover, each cliff proximity sensor has at least two wires collected in at least one wire collector, which is connected to the auxiliary circuit board.

In some implementations, the obstacle sensor system includes at least one optical confinement sensor disposed on the bumper frame and having a horizontal field of view of between 45 degrees and 270 degrees. The optical confinement sensor has at least two wires collected in at least one wire collector, which is connected to the auxiliary circuit board.

The array of proximity sensors may include an array of at least four discrete proximity sensors. In some examples, the array of proximity sensors includes a first sensor array having three or more proximity sensors of a first sensor type and a second sensor array having three or more sensors of a second sensor type distinct from the first sensor type. In some examples, notwithstanding the sensor array being described as an array of proximity sensors, the first sensor type and second sensor type, distinct from the first sensor type, may be any variety of sensors described herein other than proximity sensors. The first sensor array may be disposed vertically above the second sensor array on the bumper frame with respect to the floor surface. One of the sensor arrays may include an array of wall proximity sensors disposed evenly along a forward perimeter of the bumper frame. Each wall proximity sensor is directed outward substantially parallel to the floor surface. The other sensor array may include an array of cliff proximity sensors distributed along the bumper frame and disposed forward of wheels of the drive system. Each cliff proximity sensor is directed downward at the floor surface for detecting a falling edge of the floor surface. Moreover, each cliff proximity sensor has at least two wires collected in at least one wire collector, which is connected to the auxiliary circuit board.

In some implementations, the auxiliary circuit board receives sensor signals from the array of proximity sensors, executes sensor data processing on the received sensor signals, and packages the processed sensor signals into a data packet recognizable by the main circuit board. The sensor data processing may include at least one of analog-to-digital conversion, signal filtering, or signal conditioning.

In some examples, the bumper body houses and seals the bumper frame and the obstacle sensor system against fluid infiltration. The bumper body may define an orifice sized to receive the serial communication line and the orifice may define an area of less than one square centimeter. In some examples, the orifice defines an area less than one hundredth the surface area of the bumper body. The serial communication line has a sealed fit with the orifice.

Another aspect of the disclosure provides for a mobile robot. The mobile robot includes an array of proximity sensors distributed along the bumper frame, and each proximity sensor includes an infrared emitter having an emission field and an infrared detector having a detection field. Each proximity sensor has a sensor length defined between the infrared emitter and an infrared detector. Each proximity sensor in the array corresponds to a predetermined proximity sensor position along the front periphery of the mobile robot and at least some of the proximity sensors in the array overlap one another along the front periphery of the mobile robot.

In some examples, the cumulative total of the individual sensor lengths in the array is greater than a length of the array taken along the front periphery of the robot.

In some examples, each proximity sensor has at least two wires collected in at least one wire collector, which is connected to the auxiliary circuit board. A serial communication line connecting the auxiliary circuit board to the main circuit board, the communication line having fewer than half the number of wires connecting the proximity sensor array to the auxiliary circuit board. The bumper also includes a bumper body housing the bumper frame and the obstacle sensor system. The bumper body defines an orifice sized to receive the serial communication line.

In some implementations, the bumper body seals the bumper frame and the obstacle sensor system against fluid infiltration. The serial communication line has a sealed fit with the orifice.

At least one proximity sensor may include a pair of converging infrared emitter-sensor elements, a sonar sensor, an ultrasonic sensor, a three-dimensional volumetric point cloud imaging device, or a contact sensor. In some examples having an infrared emitter and infrared detector, the infrared emitter and the infrared detector are arranged so that the emission field overlaps with the detection field.

In some implementations, the array of proximity sensors includes an array of wall proximity sensors disposed evenly along a forward perimeter of the bumper frame. Each wall proximity sensor is directed outward substantially parallel to the floor surface.

The obstacle sensor system may include an array of cliff proximity sensors distributed along the bumper frame and disposed forward of wheels of the drive system. Each cliff proximity sensor is directed downward at the floor surface for detecting a falling edge of the floor surface. Moreover, each cliff proximity sensor has at least two wires collected in at least one wire collector, which is connected to the auxiliary circuit board.

In some implementations, the obstacle sensor system includes at least one optical confinement sensor disposed on the bumper frame and having a horizontal field of view of between 45 degrees and 270 degrees. The optical confinement sensor has at least two wires collected in at least one wire collector, which is connected to the auxiliary circuit board.

The array of proximity sensors may include an array of at least four discrete proximity sensors. In some examples, the array of proximity sensors includes a first sensor array having three or more proximity sensors of a first sensor type and a second sensor array having three or more sensors of a second sensor type distinct from the first sensor type. The first and second sensor array types may be at least any of the sensor types herein discussed. The first sensor array may be disposed vertically above the second sensor array on the bumper frame with respect to the floor surface. One of the sensor arrays may include an array of wall proximity sensors disposed evenly along a forward perimeter of the bumper frame. Each wall proximity sensor is directed outward substantially parallel to the floor surface. The other sensor array may include an array of cliff proximity sensors distributed along the bumper frame and disposed forward of wheels of the drive system. Each cliff proximity sensor is directed downward at the floor surface for detecting a falling edge of the floor surface. Moreover, each cliff proximity sensor has at least two wires collected in at least one wire collector, which is connected to the auxiliary circuit board.

In some implementations, the auxiliary circuit board receives sensor signals from the array of proximity sensors, executes sensor data processing on the received sensor signals, and packages the processed sensor signals into a data packet recognizable by the main circuit board. The sensor data processing may include at least one of analog-to-digital conversion, signal filtering, or signal conditioning.

Another aspect of the disclosure provides for a mobile robot. The mobile robot includes an array of proximity sensors distributed along the bumper frame, and each proximity sensor includes an infrared emitter having an emission field and an infrared detector having a detection field. Each proximity sensor has at least two wires collected in at least one wire collector, the at least one wire collector connected to an auxiliary circuit board. A communication line connects the auxiliary circuit board to the main circuit board. A unified encasement, which in some examples is a monocoque enclosure, has two or more mating concave receptacles. The two or more mating concave receptacles mate along a closed rim and are sealed along that rim. The unified encasement encloses the array of proximity sensors and the auxiliary circuit board. The unified encasement includes a singled sealed aperture through which the communication line exits.

In some examples, the communication line is a serial communication line having fewer than half the number of wires connecting the array of proximity sensors to the auxiliary circuit board.

In some examples, the single sealed aperture defines an area less than one hundredth of the surface area of the unified encasement defined by the mating concave receptacles. In any of the examples above, the single sealed aperture is an orifice defining area of less than one square centimeter. In any of the examples listed above, the mobile robot of claim wherein a unified encasement defined by the mating concave receptacles has a Japanese Industrial Standard (JIS) water resistance rating of 3 or more. In any of the examples above, the mobile robot of claim wherein the unified encasement is made of IR transparent and visible light-blocking plastic In yet another aspect of the disclosure, a method of operating a mobile robot having a bumper includes receiving sensor signals in a auxiliary circuit board disposed on the bumper from one or more sensors disposed on the bumper, processing the received sensor signals on the bumper controller, and communicating a sensor event based on the processed sensor signals from the auxiliary circuit board to a robot controller of the robot.

In some implementations, the method includes receiving sensor signals from at least one of a contact sensor disposed on the bumper, a proximity sensor disposed on the bumper, or a camera disposed on the bumper. The processing of the received sensor signals may include at least one of analog-to-digital conversion, signal filtering, or signal conditioning. The method may include communicating the sensor event from the auxiliary circuit board to the robot controller over a single communication pathway, which may be sealed against fluid infiltration.

The method may include executing a mapping routing on the robot controller in response to the received sensor event from the auxiliary circuit board for determining a local sensory perception of an environment about the robot. Moreover, the method may include issuing a drive command from the robot controller to a drive system of the robot based on a result of the executed mapping routine.

In some examples, the method includes executing a control system on the robot controller. The control system includes a control arbitration system and a behavior system in communication with each other. The behavior system executes at least one behavior that influences execution of commands by the control arbitration system based on sensor events received from the bumper controller. The at least one behavior may influence execution of commands by the control arbitration system based on sensor signals received from a robot sensor system.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
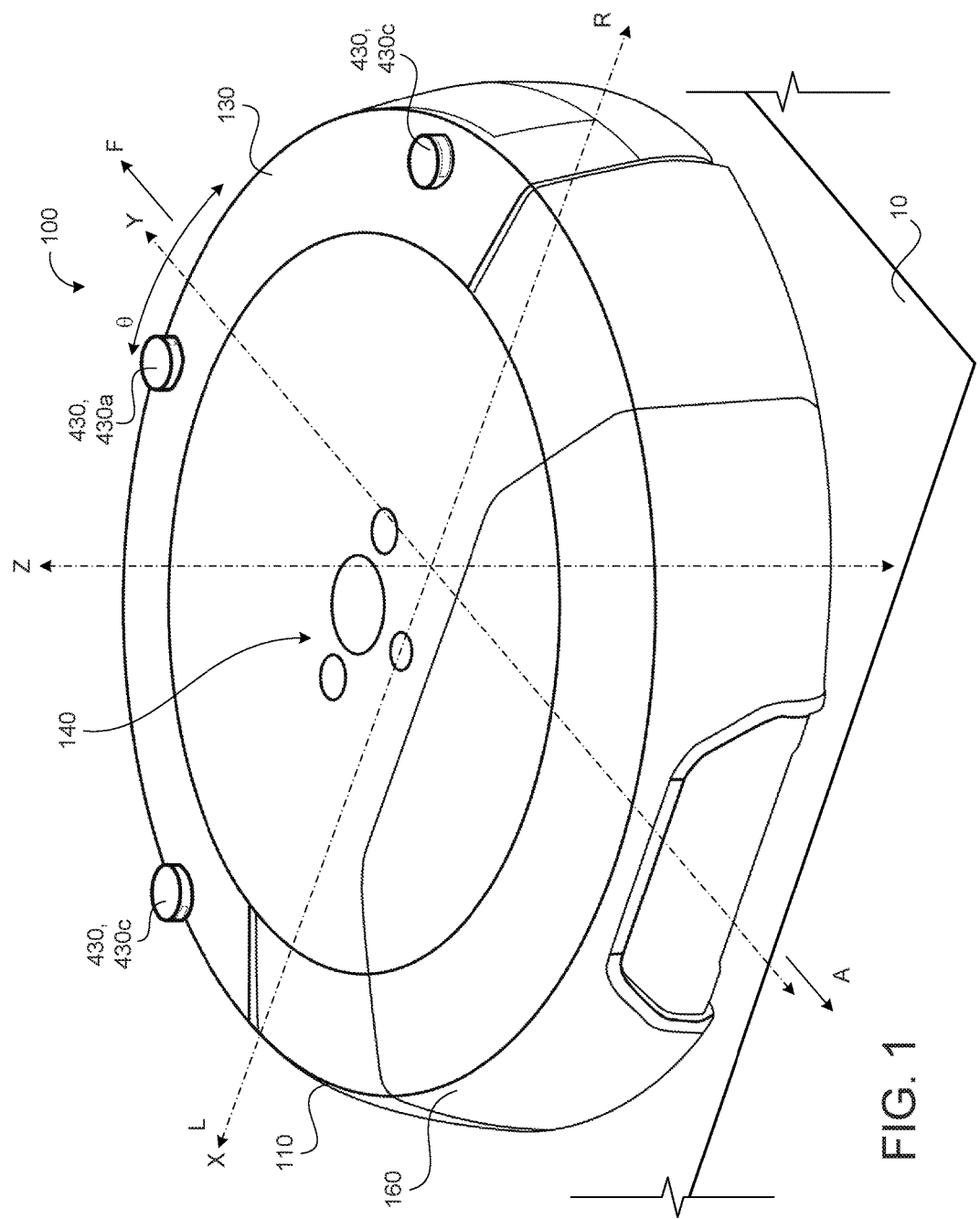
FIG. 1 is a perspective view of an exemplary surface cleaning robot.
Figure 2:
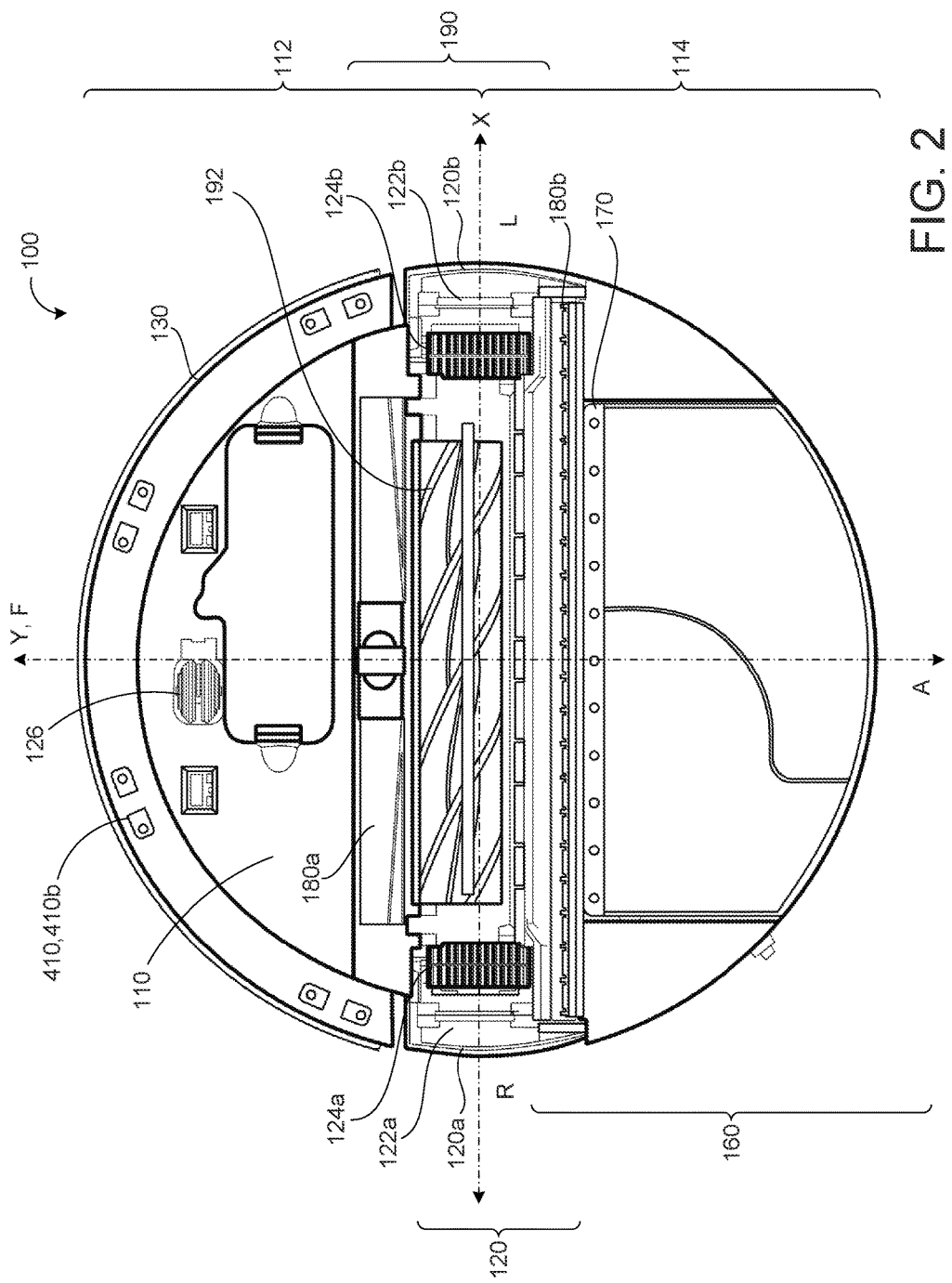
FIG. 2 is a bottom view of the robot shown in FIG. 1.
Figure 3:
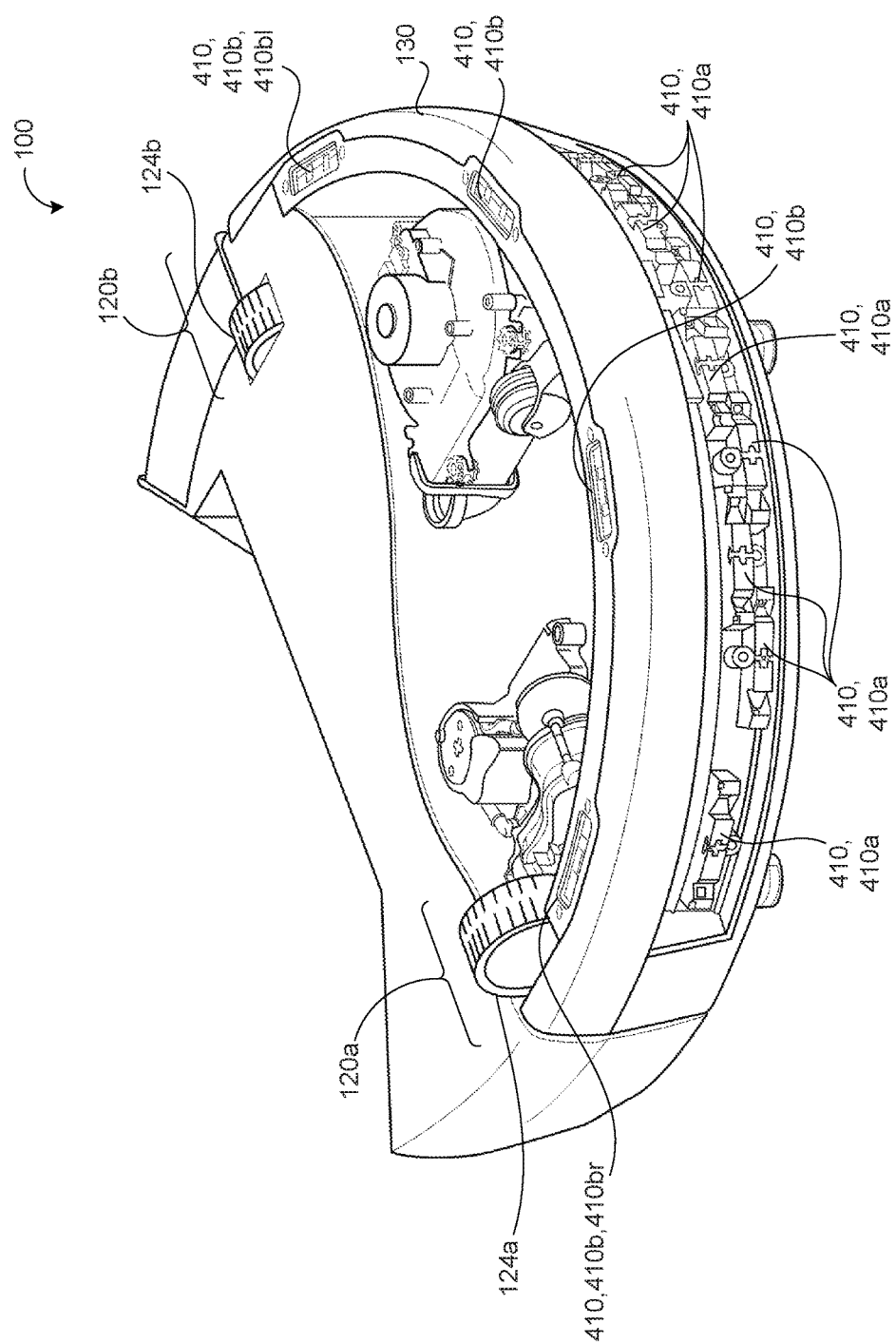
FIG. 3 is a partial exploded view of the robot shown in FIG. 1.

A mobile autonomous robot can clean while traversing a surface. The robot can remove wet debris from the surface by agitating the debris and/or wet clean the surface by applying a cleaning liquid to the surface, spreading (e.g., smearing, scrubbing) the cleaning liquid on the surface, and collecting the waste (e.g., substantially all of the cleaning liquid and debris mixed therein) from the surface.

Referring to FIGS. 1-4, in some implementations, a robot 100 includes a body 110 supported by a drive system 120. The robot body 110 has a forward portion 112 and a rearward portion 114. The drive system 120 includes right and left driven wheel modules 120a, 120b. The wheel modules 120a, 120b are substantially opposed along a transverse axis X defined by the body 110 and include respective drive motors 122a, 122b driving respective wheels 124a, 124b. The drive motors 122a, 122b may releasably connect to the body 110 (e.g., via fasteners or tool-less connections) with the drive motors 122a, 122b optionally positioned substantially over the respective wheels 124a, 124b. The wheel modules 120a, 120b can be releasably attached to the body 110 and forced into engagement with a cleaning surface 10 by respective springs. The robot 100 may include a caster wheel 126 disposed to support a forward portion 112 of the robot body 110.

The robot 100 can move across the cleaning surface 10 through various combinations of movements relative to three mutually perpendicular axes defined by the body 110: a transverse axis X, a fore-aft axis Y, and a central vertical axis Z. A forward drive direction along the fore-aft axis Y is designated F (sometimes referred to hereinafter as "forward"), and an aft drive direction along the fore-aft axis Y is designated A (sometimes referred to hereinafter as "rearward"). The transverse axis X extends between a right side R and a left side L of the robot 100 substantially along an axis defined by center points of the wheel modules 120a, 120b.

The robot 100 may include a wet cleaning system 160 having a fluid applicator 170 that extends along the transverse axis X and dispenses cleaning liquid onto the surface 10 during wet vacuuming rearward of a wet vacuum squeegee 180b to allow the dispensed fluid to dwell on the cleaning surface 10. As the robot 100 maneuvers about the cleaning surface 10, the wet vacuum squeegee 180b sucks up previously dispensed liquid and debris suspended therein.

The robot 100 may include a dry cleaning system 190 having a roller brush 192 (e.g., with bristles and/or beater flaps) extending parallel to the transverse axis X and rotatably supported by the robot body 110 to contact the floor surface 10 rearward of a dry vacuum squeegee 180a and forward of the wet vacuum squeegee 180b.

Referring to FIGS. 1-7, in some implementations, a forward portion 112 of the body 110 carries a bumper 130, which detects (e.g., via one or more sensors) one or more events in a drive path of the robot 100, for example, as the wheel modules 120a, 120b propel the robot 100 across the cleaning surface 10 during a cleaning routine. The robot 100 may respond to events (e.g., obstacles, cliffs, walls) detected by the bumper 130 by controlling the wheel modules 120a, 120b to maneuver the robot 100 in response to the event (e.g., away from an obstacle). While some sensors are described herein as being arranged on the bumper 130, these sensors can additionally or alternatively be arranged at any of various different positions on the robot 100.

In some implementations, the bumper 130 includes a bumper frame 131 supported by the robot body 110 and defining a shape complimentary of a front periphery of the robot body 110. A obstacle sensor system 400, disposed on the bumper frame 131, includes a bumper controller 450, e.g., a multiplexing and serializing auxiliary circuit board that includes a computing processor 452 (e.g., microcontroller) and memory 454, such as a non-transitory memory. The computing processor 452 is capable of executing instructions stored on the memory 454. The auxiliary circuit board 450 receives sensor signals from bumper sensors 410 disposed on the bumper 130 (e.g., on the bumper frame 131 or bumper housing 133) and communicates (e.g., via serial communication) with a robot controller 150 (e.g., a main circuit board) carried by the body 110. For example, the auxiliary circuit board 450 receives sensor signals from the bumper sensors 410, processes sensor data and communicates a data packet 455 (FIG. 10) to the robot controller 150 (i.e. main circuit board) with sensor states. A bumper housing 133 having first and second portions 133a, 133b (e.g., which may connect together) may house the frame 131 and the obstacle sensor system 400. The bumper housing 133 may seal (e.g., hermetically) the obstacle sensor system 400 therein to avoid electrical shorts and damage that may result from fluid infiltration.

Figure 5:
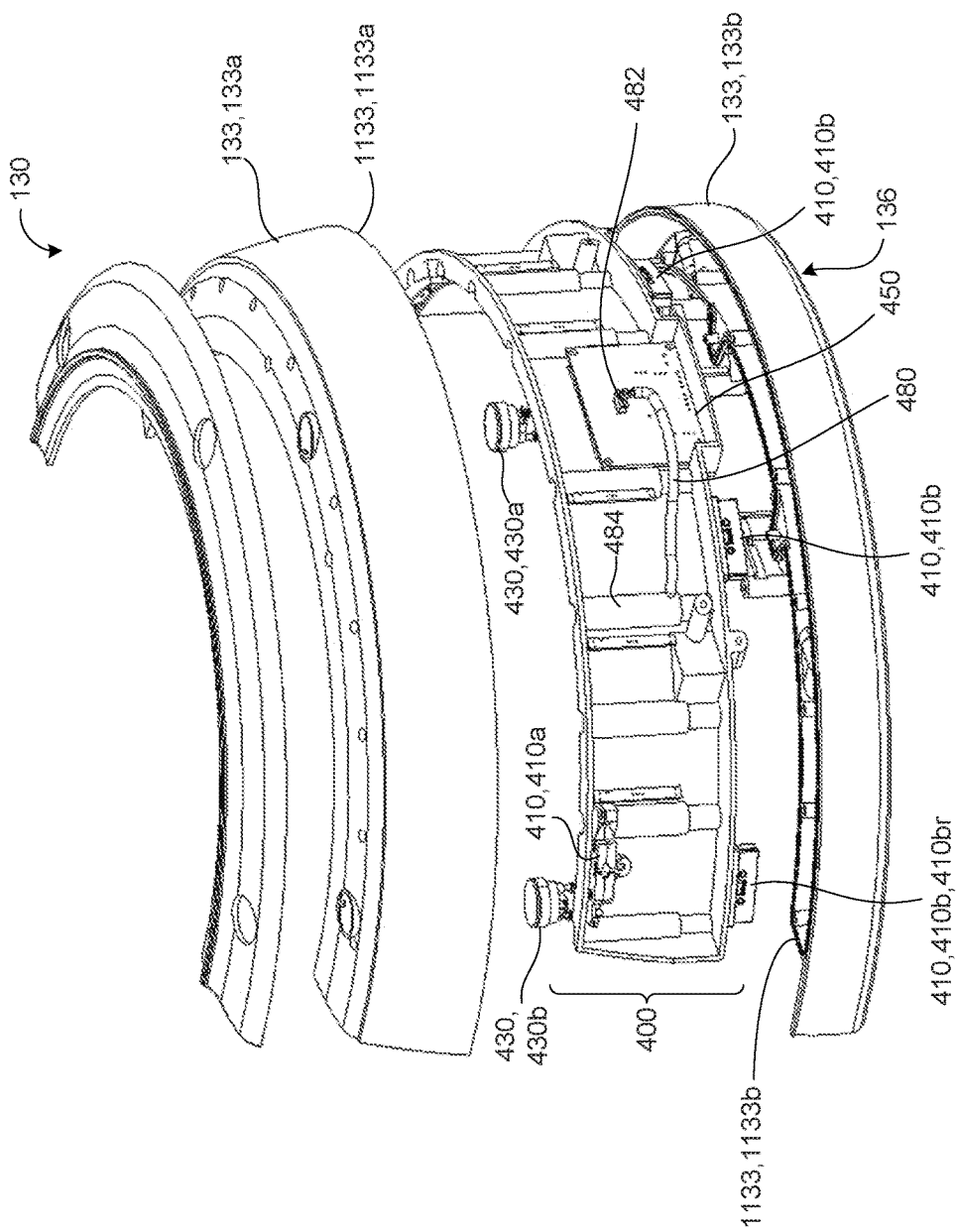
FIG. 5 is a partial exploded view of an exemplary bumper for a coverage robot.
Figure 7:
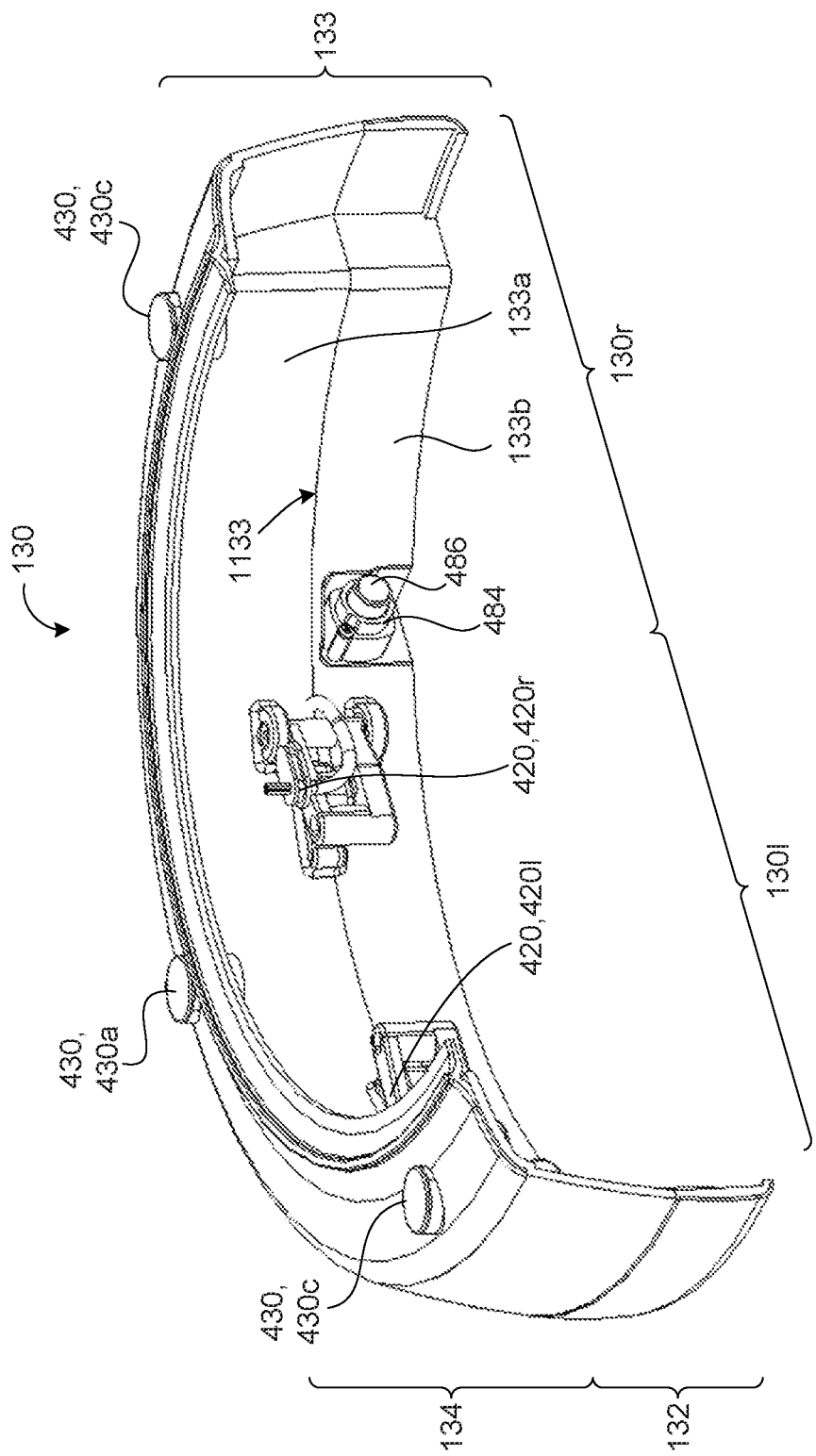
FIG. 7 is a rear perspective view of an exemplary bumper for a coverage robot.

As shown in FIGS. 5 and 7, in some implementations, the bumper housing 133 is a unified encasement including two or more mating concave receptacles, for example the first and second portions 133a, 133b. The two or more mating concave receptacles 133a, 133b mate along a closed rim 1133 that includes a seal, such as a gasket (not shown), along that rim 1133 to enclose the frame 131 and all elements disposed thereon. The rim 1133 is the juncture between a first rim portion 1133a of the first mating concave receptacle 133a and a second rim portion 1133b of the second mating concave receptacle 133b. In some examples, the bumper housing 133 is a monocoque enclosure for the frame 131 and all elements disposed thereon, such as an array of sensors 410 and bumper controller 450 (also referred to as a remote or auxiliary circuit board). The bumper housing 133 seals therein the bumper sensors 410, such as an array of proximity sensors 410, and the auxiliary circuit board 450. The bumper housing 133 includes a single sealed aperture 485 through which a communication line 480 exits from the auxiliary circuit board 450 to mate with a main circuit board of the robot 150. In some examples, the bumper housing 133 is made from infrared (IR) transparent and visible light-blocking plastic.

In some implementations, the single sealed aperture 485 defines an area less than one hundredth of the surface area of the bumper housing 133 defined by the mating concave receptacles 133a, 133b. The single sealed aperture 485 may be an orifice defining area of less than one square centimeter.

The bumper housing 133 has a Japanese Industrial Standard (JIS) water resistance rating of 3 or more. The JIS rating scale for product water resistance is a ratings scale that uses "0" to "8" to define the level of water ingress protection built into a product. The various JIS classes are defined according to the following definitions:

JIS "0"—No special protection

JIS "1"—Vertically dripping water shall have no harmful effect (Drip resistant 1)

JIS "2"—Dripping water at an angle up to 15 degrees from vertical shall have no harmful effect (Drip resistant 2)

JIS "3"—Falling rain at an angle up to 60 degrees from vertical shall have no harmful effect (Rain resistant)

JIS "4"—Splashing water from any direction shall have no harmful effect (Splash resistant)

JIS "5"—Direct jetting water from any direction shall have no harmful effect (Jet resistant)

JIS "6"—Direct jetting water from any direction shall not enter the enclosure (Water tight)

JIS "7"—Water shall not enter the enclosure when it is immersed in water under defined conditions (Immersion resistant)

JIS "8"—The equipment is usable for continuous submersion in water under specified pressure (Submersible)

Referring also to FIGS. 8A-8D, the obstacle sensor system 400 may include one or more proximity sensors 410 disposed on the bumper 130 for detecting nearby obstacles (e.g., an array of proximity sensors 410 distributed along the bumper frame 131). In some implementations, the array of proximity sensors 410 includes at least four proximity sensors. The proximity sensors 410 may be converging infrared (IR) emitter-sensor elements, sonar sensors, ultrasonic sensors, and/or imaging sensors (e.g., 3D volumetric point cloud image sensors) that provide a signal to the auxiliary circuit board 450 when an object or obstacle is within a given range of the robot 100. In some implementations, each proximity sensor 410 includes a housing 412 that holds an optical emitter 414 and a photon detector 416 both facing away from the robot 100 and angled toward each other to have converging emission 415 and detection fields 417, respectively. In some examples, the emitter 414 and the detector 416 are arranged to have angle β of between 40 and 60 degrees (e.g., 50 degrees) therebetween, such that their corresponding emission and detection fields 415, 417 converge or overlap. In the example shown in FIG. 8C, the housing 412 is configured to shape the emission and detection fields 415, 417, such that both fields have a 10 degree spread off center on one side (e.g. on an outer portion) and a 25-30 degree spread off center on the other side (e.g., on an inner portion). Moreover, each proximity sensor 410 may have at least two wires 413 collected in at least one wire collector 401, which connects to the auxiliary circuit board 450. In some implementations, the wire collector 401 is a wire harness, a flexible circuit board, or a ribbon cable. In the example shown in FIG. 8A, the wire collector 401 is a wire harness that connects to the auxiliary circuit board 450 at a connector 402. The obstacle sensor system 400 also includes a serial communication line 480 connecting the auxiliary circuit board 450 to the main circuit board 150. The communication line 480 includes fewer than half the quantity, or number count, of wires 413 connecting the array proximity sensors 410 to the auxiliary circuit board 450.

Referring again to FIGS. 1-7, in the examples shown, the obstacle sensor system 400 includes an array of wall proximity sensors 410a (e.g., 10 wall proximity sensors 410a) arranged evenly in the bumper fame 131 along a forward perimeter of the bumper 130 and directed outward substantially parallel with the floor surface 10 for detecting nearby walls. The obstacle sensor system 400 may also include one or an array of cliff proximity sensors 410b (e.g., four cliff proximity sensors 410b) arranged to detect when the robot 100 encounters a falling edge of the floor 10, such as when it encounters a set of stairs. The cliff proximity sensor(s) 410b can point downward and be located on a lower portion 132 of the bumper 130 near a leading edge 136 of the bumper 130 and/or in front of one of the drive wheels 124a, 124b. The optical emitter 414 generates an optical signal toward the floor surface 10. The optical signal reflects off of the floor surface 10 back toward and is detected by the photon detector 416. The bumper frame 131 or bumper housing 133 may receive and hold the proximity sensor housing 412 in a particular orientation (e.g., to direct the proximity sensor downward toward the floor or outward to detect a wall). In some implementations, the bumper housing 133 defines the proximity sensor housing 412 as an integral member.

In some cases, cliff and/or wall sensing is implemented using infrared (IR) proximity or actual range sensing, using an infrared emitter 414 and an infrared detector 416 angled toward each other so as to have an overlapping emission and detection fields, and hence a detection zone, at a location where a floor should be expected. IR proximity sensing can have a relatively narrow field of view, may depend on surface albedo for reliability, and can have varying range accuracy from surface to surface. As a result, multiple discrete cliff proximity sensors 410b can be placed about the perimeter of the robot 100 to adequately detect cliffs from multiple points on the robot 100.

Each proximity sensor 410, 410a-b may modulate the optical emitter 414 at a frequency of several kilohertz and detects any signal tuned to that frequency using the photon detector 416. When the photon detector 416 fails to output a detection signal, the expected target surface is not present and no overlap is detected. In response, the auxiliary circuit board 450 may send a data packet 455 indicating detection of a wall or a cliff to the robot control 150, which can execute an avoidance algorithm causing the robot 100 to avoid the detected the wall or cliff. When a reflected optical signal is detected, processing continues.

In some implementations, the cliff proximity sensors 410b detect stasis of the robot 100. For example, the robot controller 150 may execute a command that causes the robot 100 to move back and forth in a wiggle motion along the floor surface 10. Without substantial interference from other components of the robot 100, each cliff proximity sensor 410b may detect small variations in the reflected optical signal that correspond to variations in the floor surface 10 as the robot 100 moves thereon (e.g., in a straight line motion, in a turning motion, in a wiggle motion). The auxiliary circuit board 450 and/or the robot controller 150 may determine a stasis or stuck condition when detecting an absence of variations in the reflected optical signal off of the floor surface 10.

Right and left cliff proximity sensors 410br, 410bl disposed on the bumper 130 and arranged substantially forward of and substantially aligned with the right and left drive wheels 124a, 124b, respectively, can allow the robot 100 to travel at relatively high rates of forward speed (e.g., about 200 mm/s to about 400 mm/s) while allowing the robot 100 sufficient time to detect a cliff event and successfully respond to the detected cliff event (e.g., overcoming the forces of forward momentum to stop before one or more wheels 124a, 124b goes over the cliff).

The proximity sensors 410 may function alone, or as an alternative, may function in combination with one or more contact sensors 420 (e.g., bump switches) for redundancy. For example, one or more contact or bump sensors 420 on the robot body 110 can detect if the robot 100 physically encounters an obstacle. Such contact sensors 420 may use a physical property such as capacitance or physical displacement within the robot 100 to determine when it has encountered an obstacle. In the example shown, contact sensors 420 detect movement of the bumper 130 with respect to the robot body 110. In some examples, the contact sensors 420 are rotatably mounted to the bumper 130 and include a Hall Effect sensor for detecting movement resulting from the bumper 130 contacting an object.

Referring to FIG. 7, the bumper 130 may include right and left contact sensors 420r, 420l disposed on respective right and left portions 130r, 130l of the bumper 130 for sensing bumps/contact with obstacles and for determining an angle of incidence with respect to the drive direction F and/or an orientation of the robot 100 with respect to the obstacle. For example, if the right contact sensor 420r detects a bump, while the left contact sensor 420l does not, then the robot controller 150 can determine that the robot 100 drove into an obstacle on its right side and vice-versa. If both contact sensors 420r, 420l provide a bump signal to the robot controller 150, or main circuit board, then the auxiliary circuit board 150 can determine that the robot 100 drove into an obstacle along the forward drive direction F. Although two contact sensors 420r, 420l are shown, any number of bump sensors 420 can be used.

In some implementations, the contact sensors 420r, 420l communicate with the auxiliary circuit board 450, which in turn communicates with the robot controller 150 via a bumper communication line 480 and connector 486. The communication connector 486 may be disposed on the bumper housing 133 or on the robot controller 150 and hermetically sealed therewith. The auxiliary circuit board 450 may execute a bump algorithm that determines a location, direction with respect to the forward drive direction, and/or other bump parameters in response to receiving sensor signals from any of the contact sensors 420r, 420l.

Referring to FIGS. 4-7, 9A and 9B, the obstacle sensor system 400 may include one or more confinement sensors 430 disposed on the bumper 130. The confinement sensor 430 may be an optical (e.g., infrared) sensor having a horizontal field of view 432 (e.g., between 45° and 270°) directed by optics. The controller 150 may receive sensor signals from multiple confinement sensors 430 to simulate one sensor. Moreover, the controller 150 may determine a directionally of a detected infrared beam using multiple confinement sensors 430.

Figure 9A:
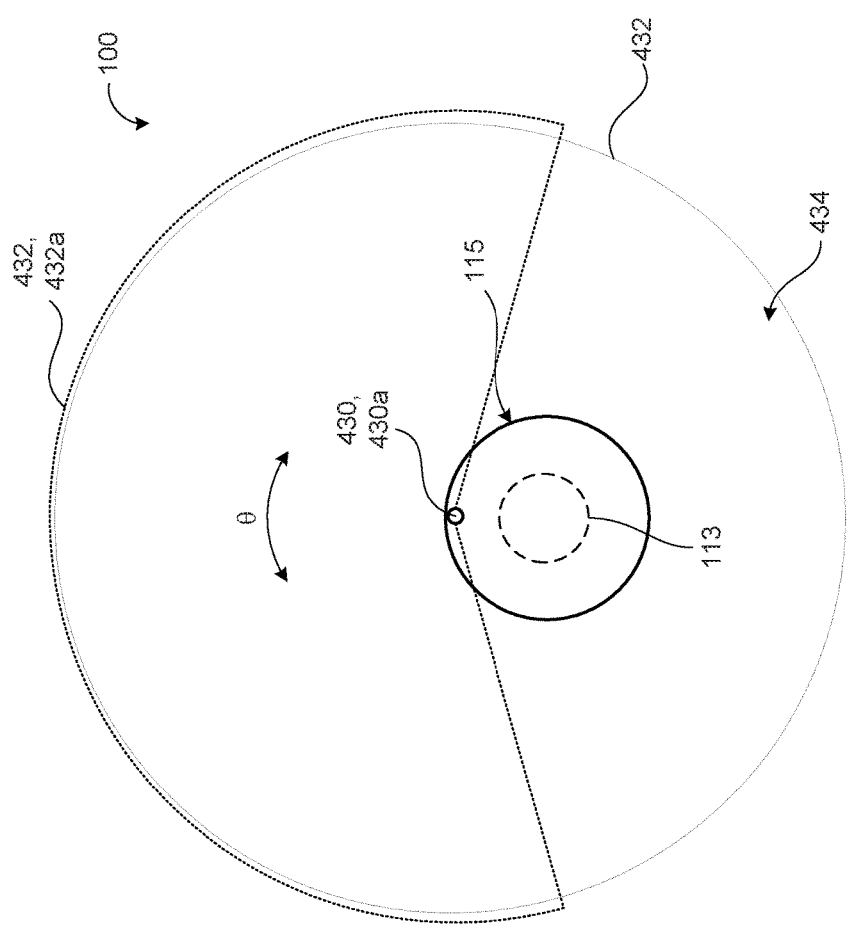
FIGS. 9A and 9B are schematic section top views of sensor fields of view for a surface cleaning robot.

In the example shown in FIG. 9A, the bumper 130 includes a single confinement sensors 430 disposed on an upper portion 134 of the bumper 130. The confinement sensor 430 may have a field of view 432 of between 30 and 360 degrees, based on the placement of the confinement sensor 430 (e.g., the field of view 432 is blocked by a portion of the robot body 110) or due to the operating parameters of the sensor. For a field of view 432a less than 360 degrees, the confinement sensor 430 may be arranged to have a blind spot area 434 directly behind the robot 100.

Figure 9B:
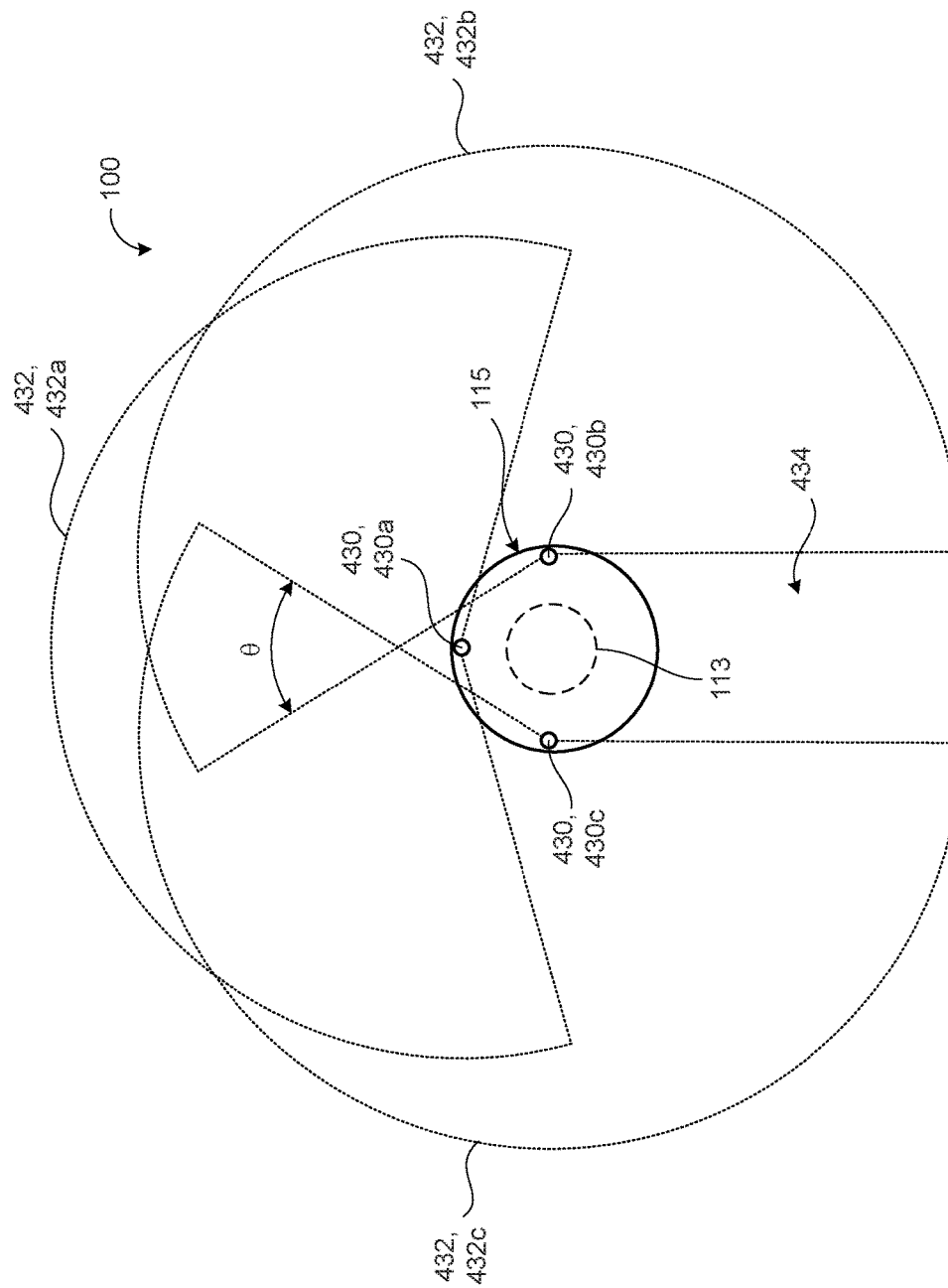

In the example shown in FIG. 9B, the bumper 130 includes first, second, and third confinement sensors 430a-c disposed on an upper portion 134 of the bumper 130. The first confinement sensor 430a aims forward along the forward drive direction F, the second confinement sensor 430b aims along the right direction R, and third confinement sensor 430c aims along the left direction L. As a result, the fields of view 432a-c of the first, second and third confinement sensors 430a-c may overlap, providing redundant sensing. In the example shown, the fields of view 432a-c of the first, second and third confinement sensors 430a-c overlap along the forward drive direction F to provide redundant sensing along that direction, so as to reduce any probability of accidentally colliding with an object/obstacle or falling off a cliff edge. In some examples, the first field of view 432a of the first confinement sensor 430a may be centered on the forward drive direction F with the second and third fields of view 432b-c of the second and third confinement sensors 430b-c overlapping by an angle θ of between 10° and 60° (e.g., about 30°) over the first field of view 432a, along the forward drive direction F. The second and third fields of view 432b-c of the second and third confinement sensors 430b-c may be arranged to view behind the robot 100 (i.e., opposite the forward drive direction F), while optionally not covering a blind spot area 434 directly behind the robot 100. Arranging at least one field of view 432a-c to view rearward allows the robot 100 to maneuver while not crossing over at a narrow angle an emitted beam signifying a virtual wall or an approach beam emitted by a docking station.

Placement of the confinement sensor(s) 430, 430a-c on the bumper 130 (e.g., along a periphery 113 of the robot body 110) versus in a central portion 113 of the robot body 110 allows the robot 110 to detect virtual wall infrared beams (emitted by a beacon) proximate the periphery 113 of the robot body 110 while turning. Placement of a confinement sensor 430 on the central portion 113 the robot body 110 may require elevation of that sensor 430 with respect to the periphery 115 of the robot body, so that the confinement sensor 430 can detect an infrared beam proximate the periphery 113 of the robot body. Therefore, placement of the confinement sensor(s) 430, 430a-c on the bumper 130 (e.g., along a periphery 113 of the robot body 110) allows for a relatively lower overall height of the robot 100 and reduces the chances of obstacles snagging on any projections of the robot body 110.

The auxiliary circuit board 450 can poll the bumper sensors 410, 410a, 410b, 420 to receive respective sensor signals and execute sensor data processing, such as analog-to-digital conversion, filtering, and packaging of the converted and/or conditioned sensor signals into a data packet recognizable by the robot controller 150. Rather than having many wires extending between the bumper sensors 410, 410a, 410b, 420 and the robot controller 150, the auxiliary circuit board 450 provides a single communication line 480 (e.g., a serial line) for the obstacle sensor system 400 to the robot controller 150. The communication line 480 may have a first seal 482 sealing a connection with the auxiliary circuit board 450 (e.g., a printed circuit board) and/or a second seal 484 sealing its exit from the bumper housing 133 through a single orifice 485, to prevent water intrusion. In some implementations, the bumper 130 includes a connector 486 inserted through the orifice 485 and hermetically sealed with the bumper frame 131 or bumper housing 133 to prevent water intrusion.

Figure 4:
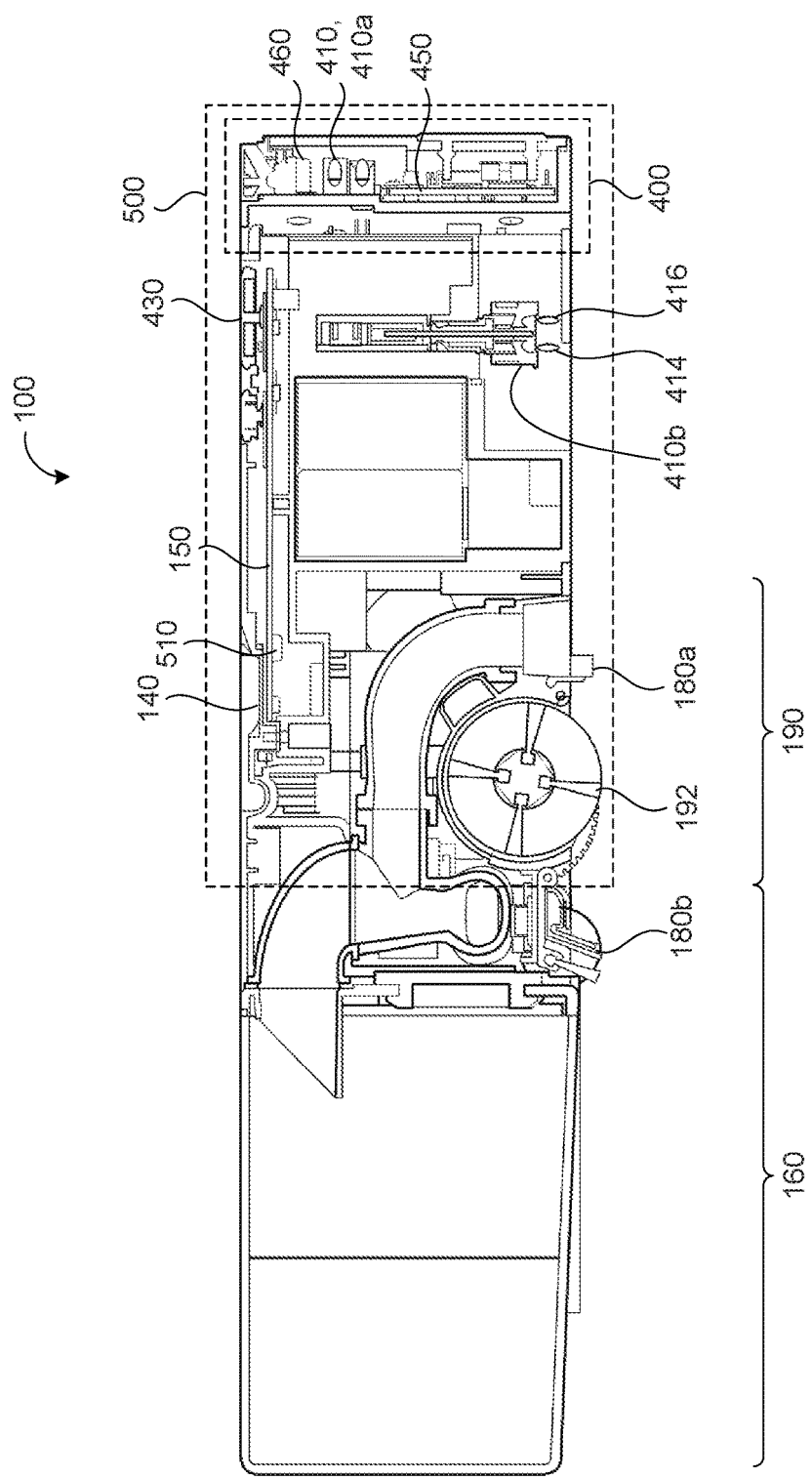
FIG. 4 is a section view of the robot shown in FIG. 1.
Figure 6:
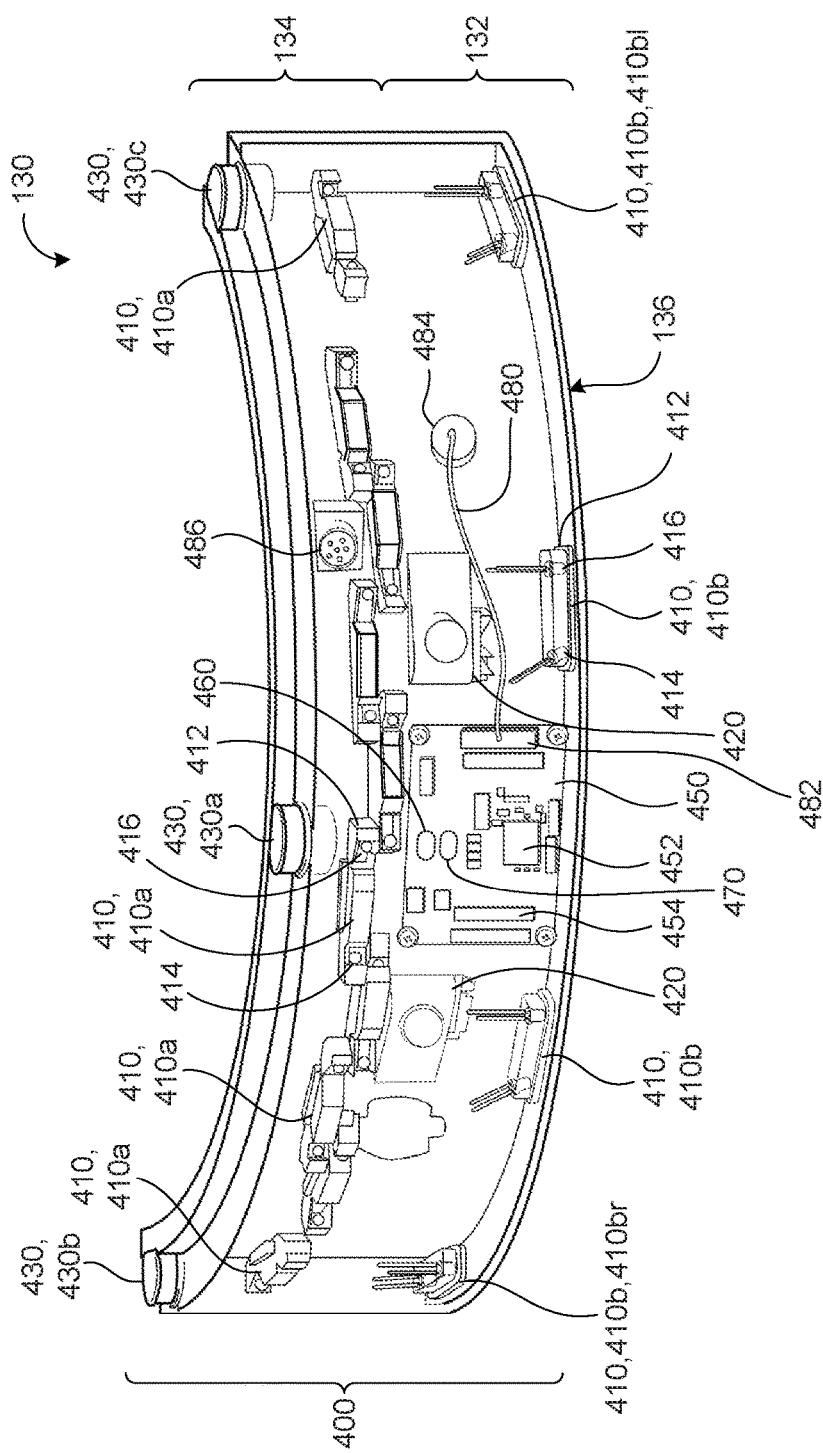
FIG. 6 is a perspective view of an exemplary obstacle sensor system.

Referring to FIGS. 4 and 6, the communication line 480 mated with the communication connector 486 reduces wire density on the robot 100 by reducing the number of wires extending between the bumper 130 and the robot 100. This configuration eliminates movement of many wires between the bumper 130 and the robot 100 and therefore reduces a likelihood of wire fatigue of those wires. This configuration is further enabled by the dedicated auxiliary circuit board 450. The auxiliary circuit board 450 processes relatively large amounts of sensor signal data and returns a data packet 455 to the robot controller 150 with the sensor states. This additional processing capacity thereby reduces the number of connections between the sensors 410 and corresponding wires in the bumper 130 and the robot controller 150 and further relieves the processing capacity of the robot controller 150 for other tasks. Because of this additional processing capacity by the auxiliary circuit board 450 mounted within the bumper 130, the dedicated auxiliary circuit board 450 further enables upgrade-ability of the bumper 130 to incorporate additional sensors 410 without reconfiguring the robot 100 or overtaxing the processing capacity of the robot controller 150. The obstacle sensor system 400 can act as a standalone modular sensor system that communicates with the robot controller 150 as a plug-n-play component.

Referring to FIGS. 8A-8F and 10A-10C, in some implementations, the bumper 130 includes a bumper frame 131 defining a shape complimentary of a front periphery of the robot body 110, and an array of proximity sensors 410 distributed along the bumper frame 131. Each proximity sensor 410 has an infrared emitter 414 and an infrared detector 416 spaced apart and arranged to have converging corresponding emission and detection fields 415, 417. Moreover, each proximity sensor 410 has a sensor length S defined between the infrared emitter 414 and the infrared detector 416. The cumulative total of individual sensor lengths S in the array is greater than a length AL (shown in dashed line in FIG. 8D) of the array of proximity sensors 410 taken along the front periphery of the mobile robot of the bumper frame 131. Each proximity sensor 410 in the array corresponds to a predetermined proximity sensor position along the front periphery of the mobile robot 100. As such the proximity sensors 410 are arranged in a stacked or vertically overlapping configuration on the bumper frame 131 such the proximity sensors 410 are staggered like laid bricks between the layers of the stack. In some examples, the sensor length S is between 20-50 mm (e.g., 36 mm). In some implementations, at least some of the proximity sensors 410 in the array overlap one another along the front periphery of the mobile robot 100.

In some implementations, one of the infrared emitter 414 and the infrared detector 416 of each proximity sensor 410 is positioned vertically, with respect to a floor surface 10 supporting the robot 100, between the infrared emitter 414 and the infrared detector 416 of another proximity sensor 410. In some examples, the bumper frame 131 defines an arc having a center point C, and the proximity sensors 410 are arranged to have a spacing α of between 5 and 20 degrees between midpoints of the sensor lengths S of adjacent proximity sensors 410. The proximity sensors 410 may be arranged to have a spacing of 12 degrees between midpoints M of the sensor lengths S of adjacent proximity sensors 410. Moreover, the proximity sensors 410 may be spaced along the bumper frame 131 equidistantly or unevenly between midpoints M of the sensor lengths S of adjacent proximity sensors 410.

The array of proximity sensors 410 may include a first sensor array 4102 of proximity sensors 410 and a second sensor array 4104 of proximity sensors disposed vertically below the first sensor array 4102 on the bumper frame 131 with respect to a floor surface 10 supporting the robot 100. One of the infrared emitter 414 and the infrared detector 416 of a proximity sensor 410 in the first sensor array 4102 may be vertically aligned, with respect to the floor surface, with one of the infrared emitter 414 and the infrared detector 416 of a proximity sensor 410 in the second sensor array 4104. In the example shown, the first and second sensor arrays 4102, 4104 are arranged in stacked evenly horizontally offset configuration; however, other arrangements are possible as well, such as uneven distributions having local collections in various locations along the bumper frame 131. The proximity sensors 410 of the first and second sensor arrays 4102, 4104 may be wall proximity sensors 410a disposed evenly along a forward perimeter of the bumper frame 131. Each wall proximity sensor 410a is directed outward substantially parallel to the floor surface 10. The auxiliary circuit board 450 may trigger the emitters 414 at time timed intervals, such that the emitters 414 of the first sensor array 4102 emit infrared light at time intervals different than the emitters 414 of the second sensor array 4104. Moreover, the auxiliary circuit board 450 may trigger the detectors 416 to sense light emissions in concert with the emitters of their respective sensor array 4102, 4104. This prevents light emissions of one sensor array 4102, 4104 from interfering with detection of light emissions of another sensor array 4102, 4104. In some examples, the proximity sensors 410 of the first sensor array 4102 are modulated differently (e.g., by phase, wavelength, or frequency) than the proximity sensors 410 of the second array 4104.

In some implementations, the first sensor array 4102 includes three or more proximity sensors 410 of a first sensor type and the second sensor array 4104 includes three or more sensors of a second sensor type distinct from the first sensor type. The first sensor array 4102 may be disposed vertically above the second sensor array 4104 on the bumper frame 131. The first and second sensor types may be for example, but not limited to, contact sensors, proximity sensors, cliff sensors, lasers, sonar, and cameras.

The obstacle sensor system may include a third sensor array 4106 of proximity sensors 410 arranged vertically below the first and second sensor arrays 4102, 4104. The proximity sensors 410 of the third sensor array 4106 may be cliff proximity sensors 410b distributed along the bumper frame 131 and disposed forward of wheels 124a, 124b of the drive system 120. Each cliff proximity sensor 410b is directed downward at the floor surface 10 for detecting a falling edge of the floor surface 10. Moreover, each cliff proximity sensor 410b has at least two wires 413 collected in at least one wire collector 401, which is connected to the auxiliary circuit board 450 at a connector 402.

Figure 10A:
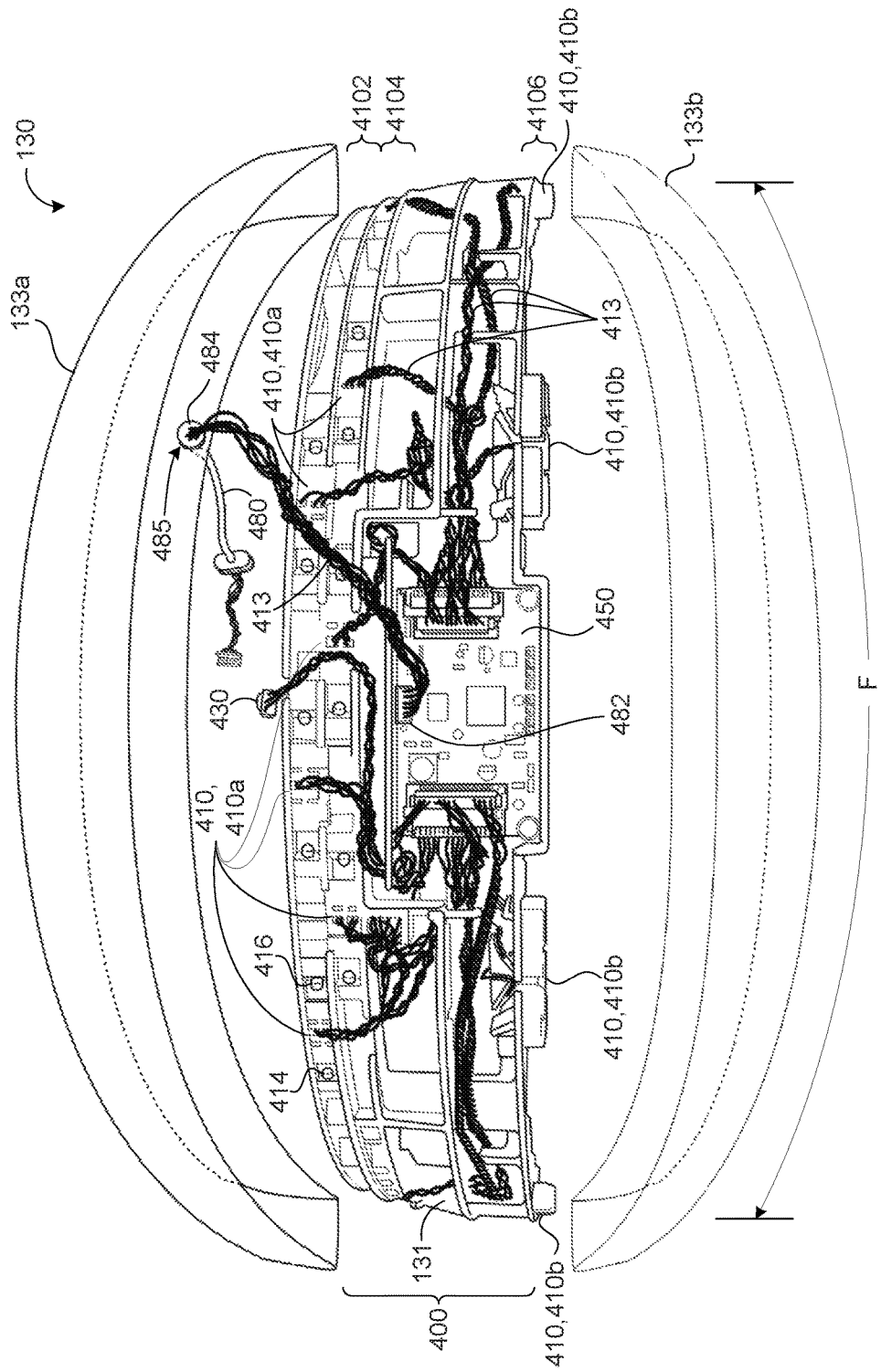
FIG. 10A is a front perspective view of an exemplary bumper supporting multiple sensor arrays.
Figure 10B:
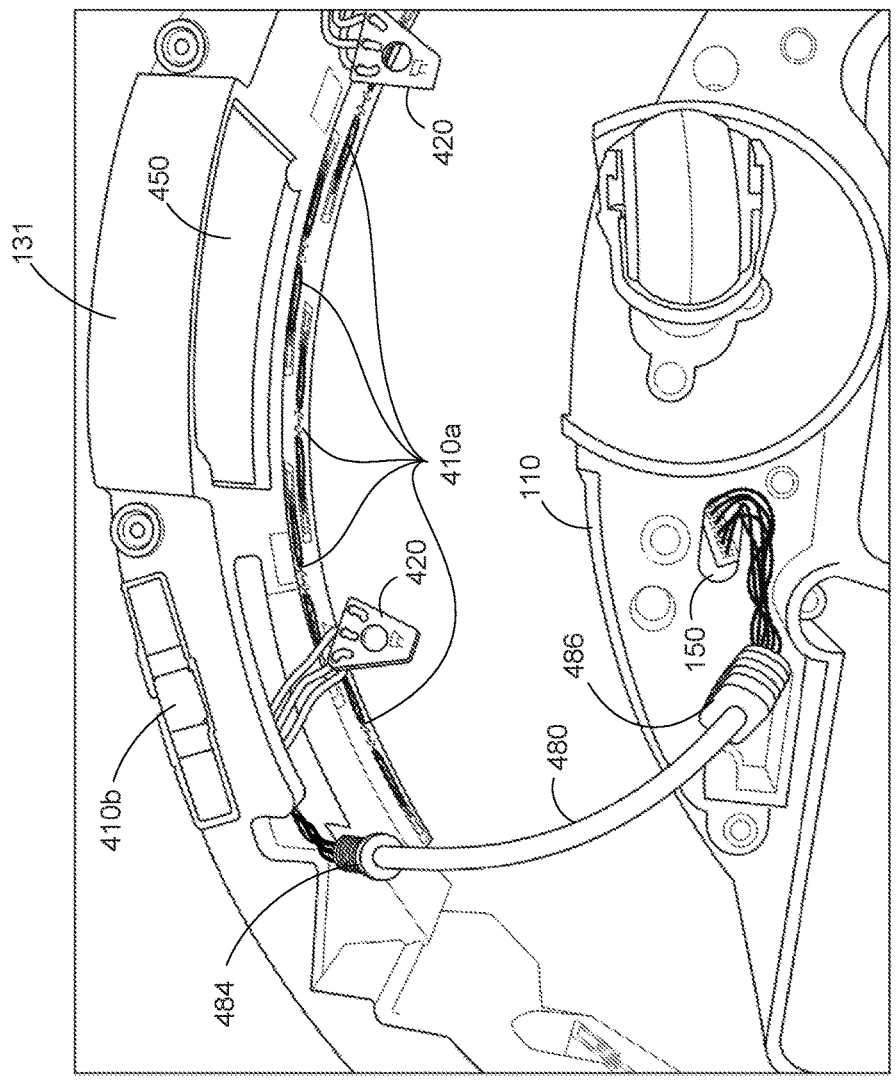
FIG. 10B is a partial top view of a bumper having a communication line connecting a auxiliary circuit board to a robot controller.

Each proximity sensors 410 of each sensor array 4102, 47104, 4106 may have at least two wires 413 that connect to the auxiliary circuit board 450 e.g., via one or more wire collectors 401. The auxiliary circuit board 450 may provide a multiplexing function by receiving sensor signals from all or most of the sensors 410 on the bumper 130 and then process the received signals to deliver one or more output signals (e.g., a serialized signal) to the robot controller 150 (main circuit board) through a single communication line 480. The communication line 480 may include fewer than half the number of wires 413 connecting the array proximity sensors 410 to the auxiliary circuit board 450, thereby significantly reducing the number of wires 413 which would otherwise need to connect to the robot control 150 without the auxiliary circuit board 450. The communication line 480 may provide a single communication pathway between the auxiliary circuit board 450 on the bumper 130 and the robot controller 150, as shown in FIG. 10B. This simplifies assembly of the robot 100 and reduces the number of wires 413 that may experience wire fatigue due to movement between the bumper 130 and the robot body 110.

Figure 11A:
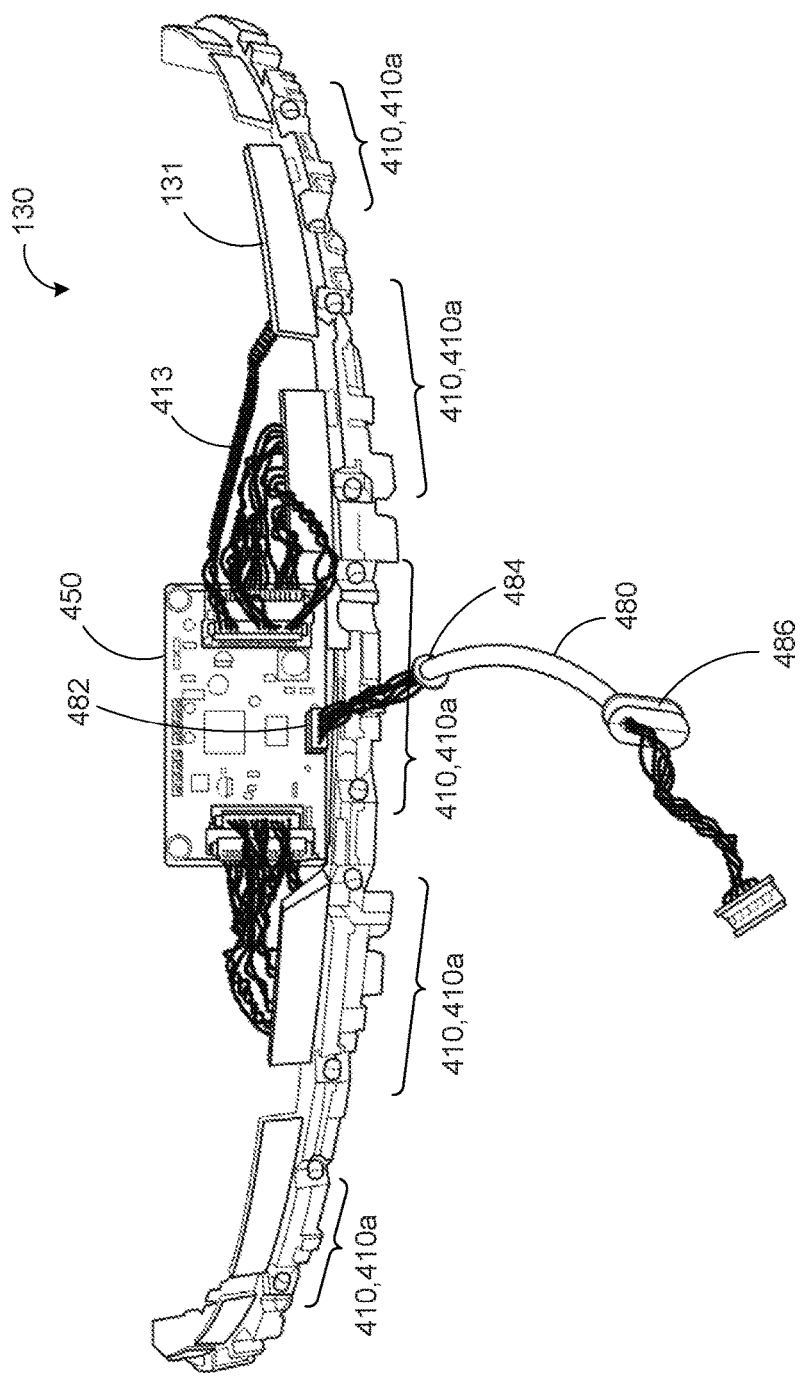
FIG. 11A is a front perspective view of an exemplary bumper supporting a auxiliary circuit board having a communication line for connecting to a robot controller.
Figure 11B:
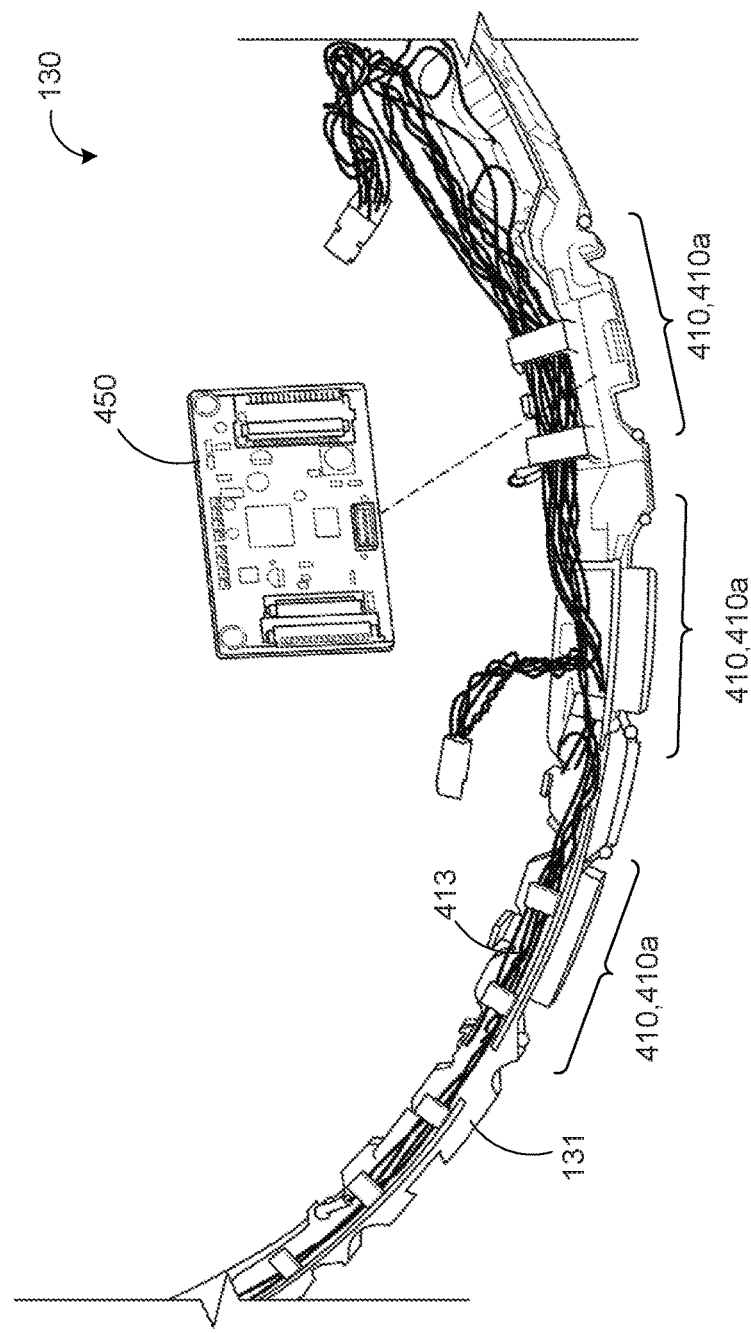
FIG. 11B is a partial top perspective view of an exemplary bumper supporting a sensor array.

FIGS. 11A and 11B illustrate a configuration of a bumper 130 having a non-stacked arrangement of proximity sensors 410 along the bumper frame 131. The obstacle sensor system 400 may an array of wall proximity sensors 410a disposed evenly along a forward perimeter of the bumper frame 131 and directed outward substantially parallel to the floor surface 10. Each proximity sensor 410 has at least two wires 413 collected in at least one wire collector 401, which is a wire harness connected to the auxiliary circuit board 450 at a connector 402. In some examples, the wire collector 401 is a wire harness, a flexible circuit board or a ribbon cable. The low profile bumper frame 131 allows for a relatively smaller bumper 130. The bumper frame 131 supports the auxiliary circuit board 450, which receives sensors signals from the sensors 410 disposed on the bumper frame 131, and optionally the bumper housing 133 (not shown). The bumper frame 131 is configured to hold or secure the wires 413 of the sensors 410 disposed thereon and route the wires 413 to the auxiliary circuit board 450, which processes sensor signals received from the connected sensors 410. A single communication line 480 connects the auxiliary circuit board 450 to the robot controller 150.

Figure 8A:
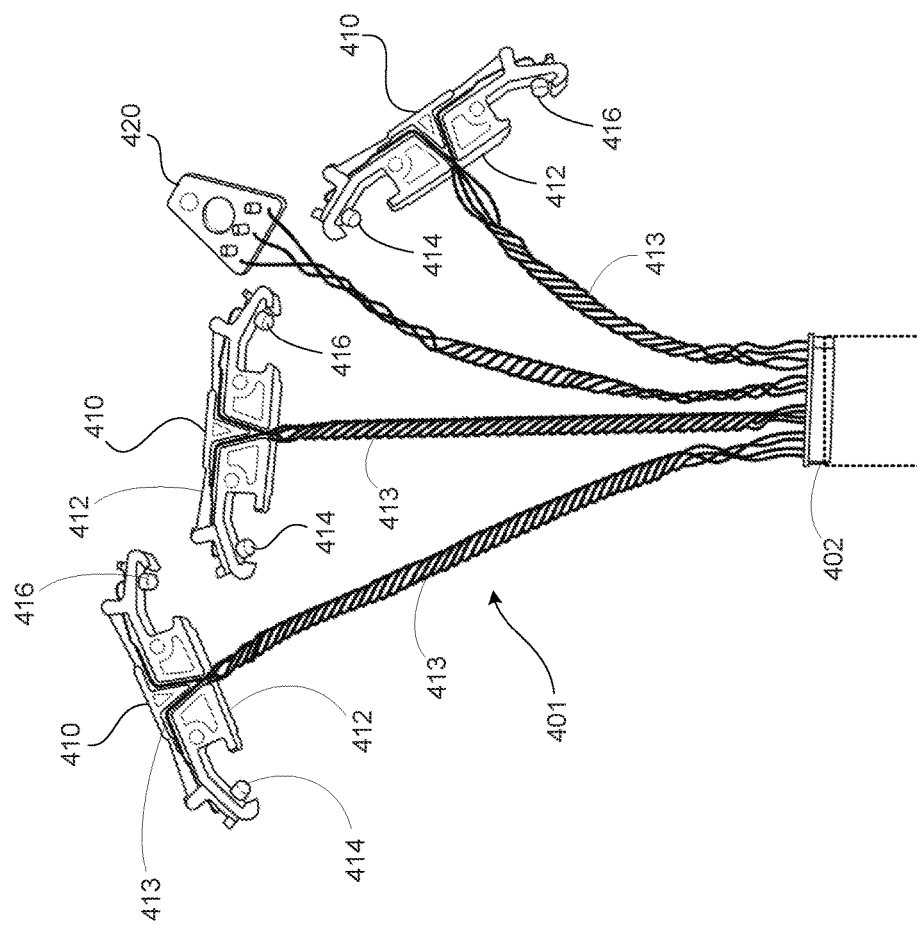
FIG. 8A is a top view of an exemplary wire collector connected to multiple proximity sensors.
Figure 8B:
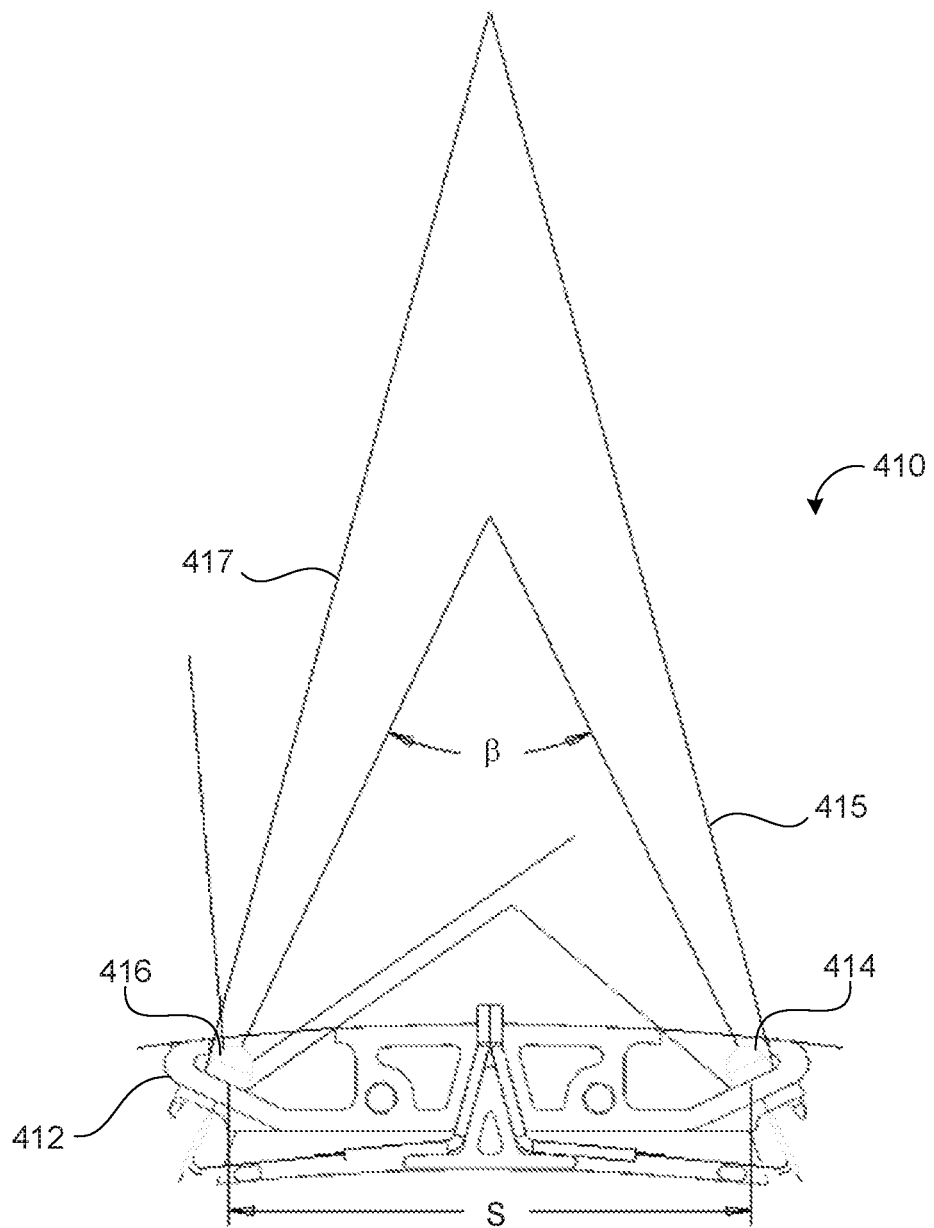
FIGS. 8B and 8C are schematic views of exemplary emission and detection fields of two stacked and staggered sensor arrays of proximity sensors arranged on a bumper.
Figure 8C:
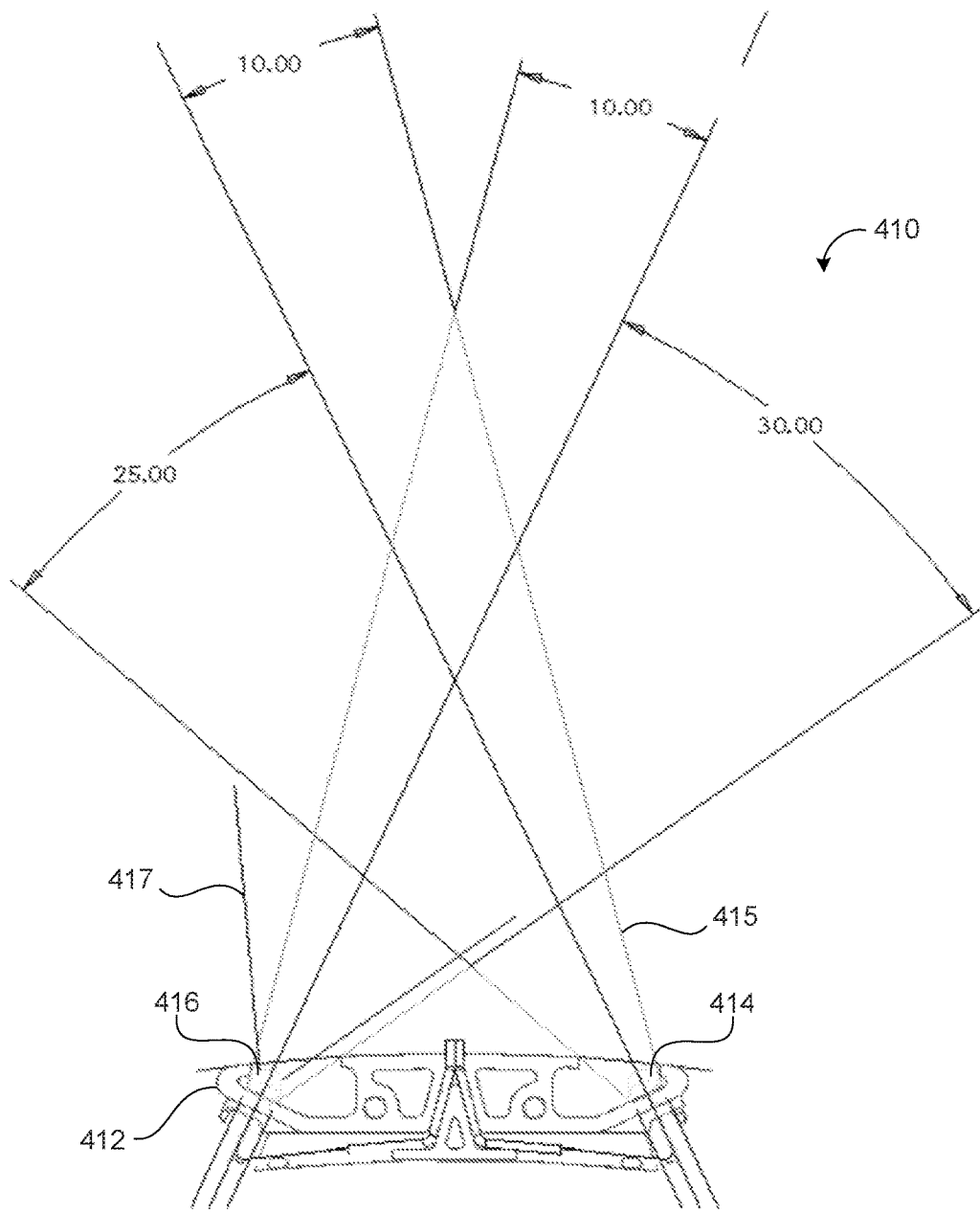
Figure 8D:
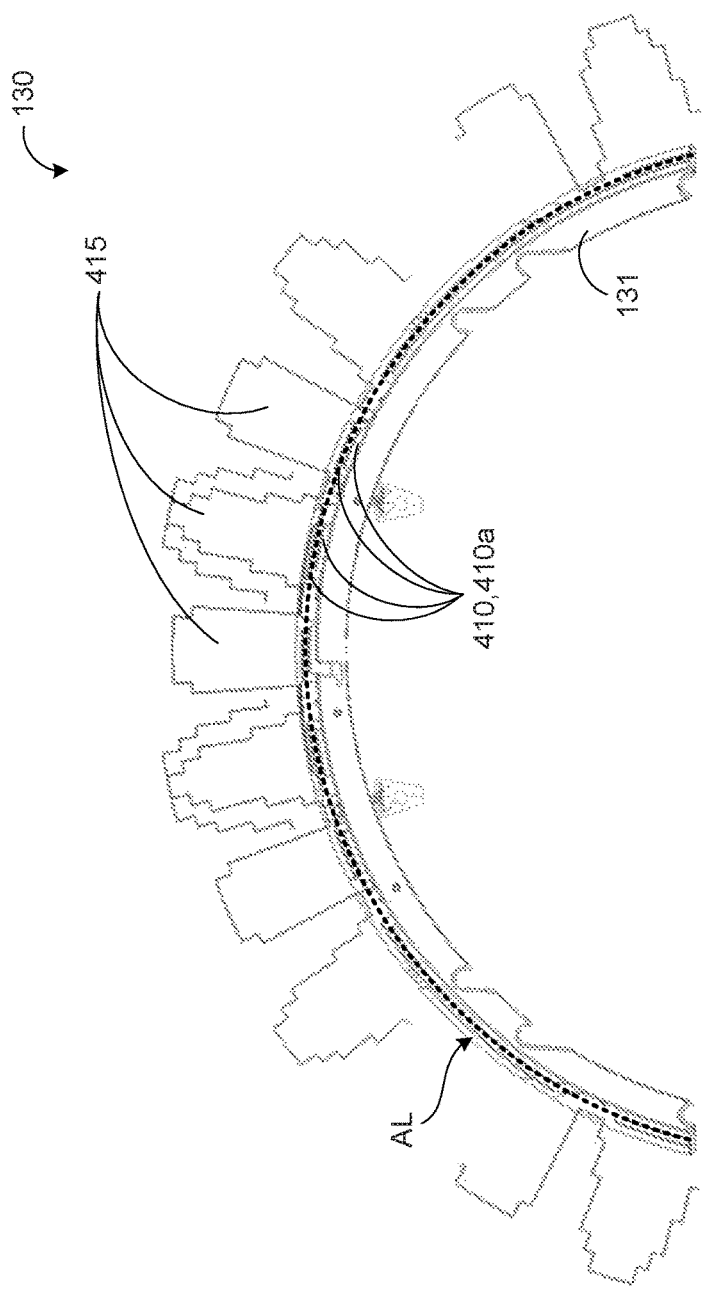
FIGS. 8D-8F are schematic views of exemplary emission and detection fields of proximity sensor.
Figure 8E:
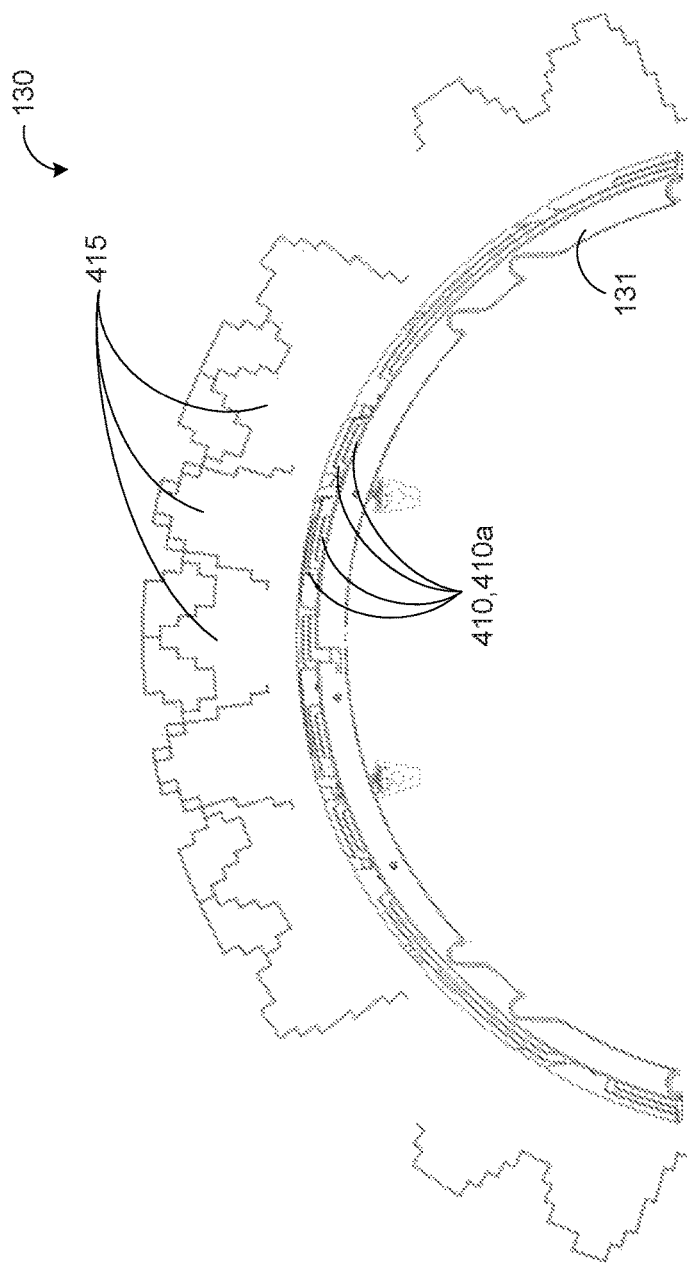
Figure 8F:
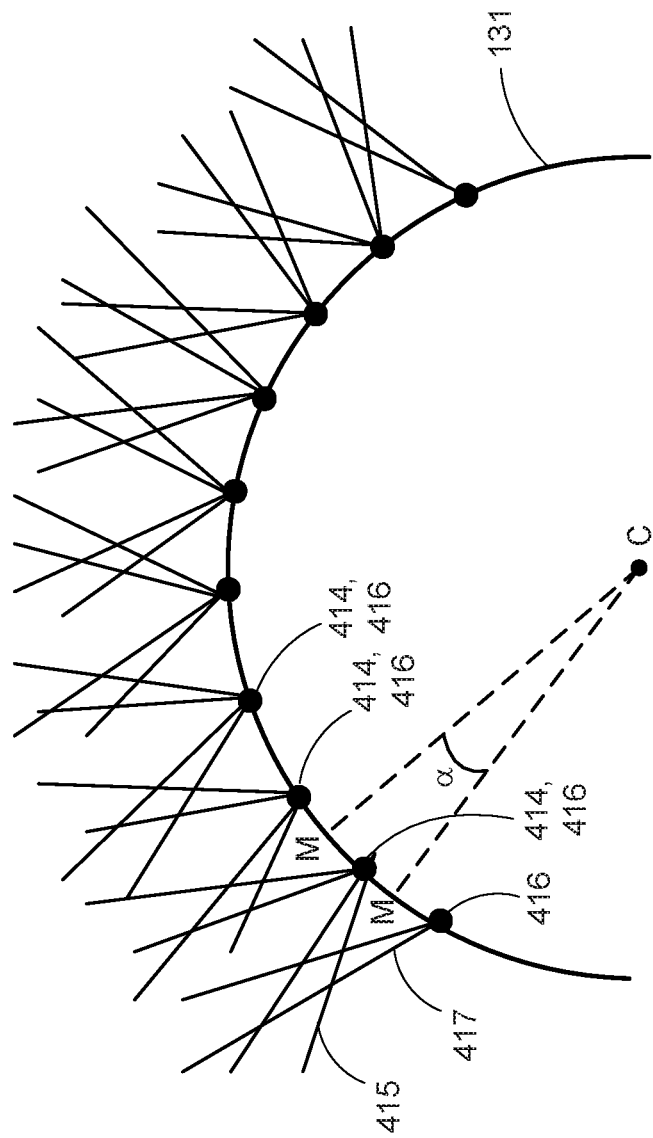
Figure 10C:
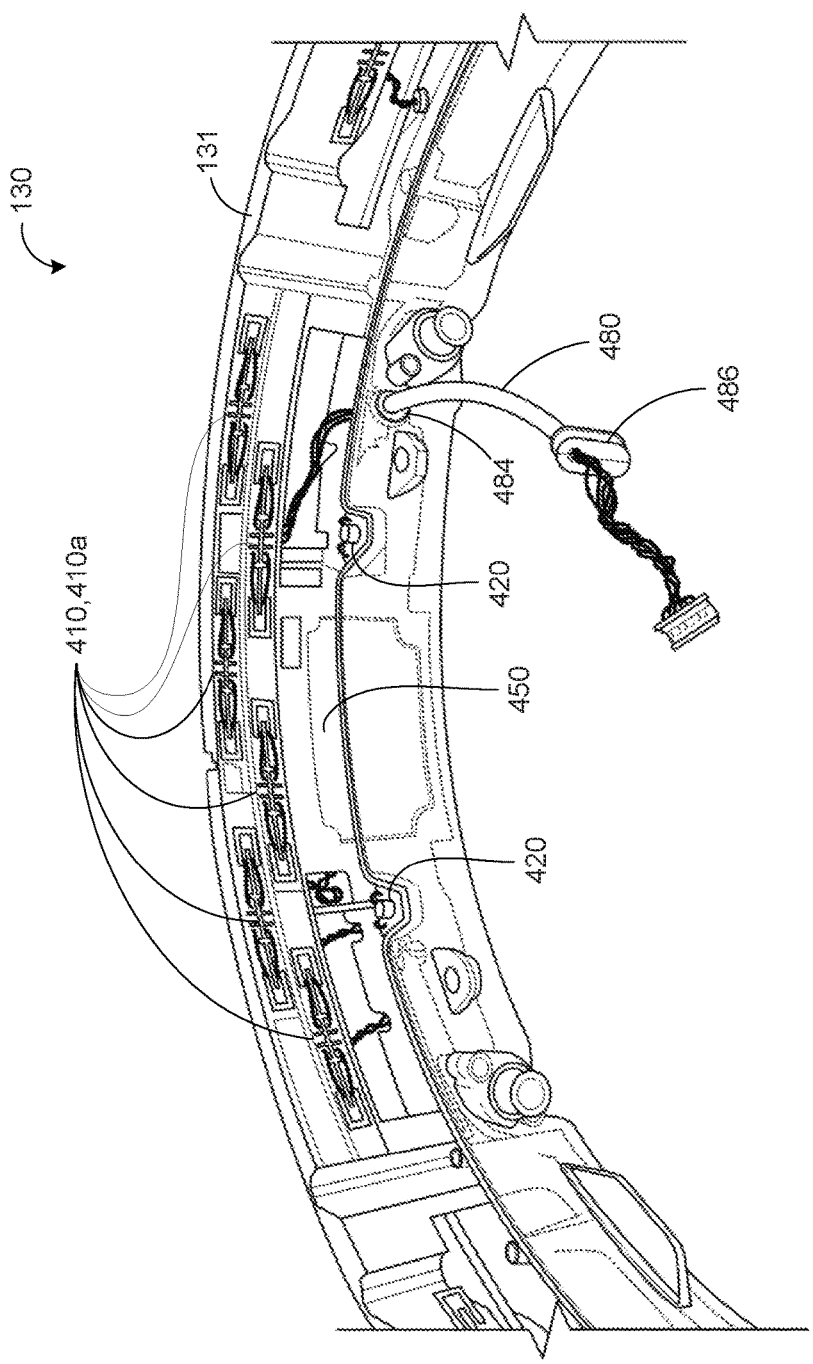
FIG. 10C is a partial rear perspective view of an exemplary bumper frame.

FIGS. 8D-8F illustrate the emission fields 415 of the emitters 414 of the proximity sensors 410 on the bumper 130 around round chair legs and square chair legs, respectively. The staggered first and second sensor arrays 4102, 4104 (e.g., vertically overlapping) provide relatively denser coverage than single non-staggered sensor arrays, as shown in FIGS. 11A and 11B. A single sensor array 4102 may include only 5 or 6 proximity sensors 410 distributed side-by-side along the bumper frame 131. The non-overlapping sensor arrangement could lead to a miss on a chair leg, causing the robot 100 to not detect and collide with the chair leg. The denser emission fields 415 of the staggered proximity sensor arrays 4102, 4104 (e.g., as shown in FIGS. 10A-10C) solves this problem by filling in the gaps between the peaks and valleys of the sensor detection fields. The first and second sensor arrays 4102, 4104 may be arranged to have a proximity sensor spacing α of about 12 degrees.

Referring to FIGS. 1 and 4, a user interface 140 disposed on a top portion of the body 110 receives one or more user commands and/or displays a status of the robot 100. The user interface 140 is in communication with the robot controller 150 carried by the robot 100 such that one or more commands received by the user interface 140 can initiate execution of a cleaning routine by the robot 100.

The robot controller 150 (executing a control system) may execute behaviors that cause the robot 100 to take an action, such as maneuvering in a wall following manner, a floor scrubbing manner, or changing its direction of travel when an obstacle is detected (e.g., by the obstacle sensor system 400). The robot controller 150 can maneuver the robot 100 in any direction across the cleaning surface 10 by independently controlling the rotational speed and direction of each wheel module 120*a*, 120*b*. For example, the robot controller 150 can maneuver the robot 100 in the forward F, reverse (aft) A, right R, and left L directions. As the robot 100 moves substantially along the fore-aft axis Y, the robot 100 can make repeated alternating right and left turns such that the robot 100 rotates back and forth around the center vertical axis Z (hereinafter referred to as a wiggle motion). The wiggle motion can allow the robot 100 to operate as a scrubber during cleaning operation. Moreover, the wiggle motion can be used by the robot controller 150 to detect robot stasis. Additionally or alternatively, the robot controller 150 can maneuver the robot 100 to rotate substantially in place such that the robot 100 can maneuver out of a corner or away from an obstacle, for example. The robot controller 150 may direct the robot 100 over a substantially random (e.g., pseudo-random) path while traversing the cleaning surface 10. The robot controller 150 can be responsive to one or more sensors (e.g., bump, proximity, wall, stasis, and cliff sensors) disposed about the robot 100. The robot controller 150 can redirect the wheel modules 120*a*, 120*b* in response to signals received from the sensors, causing the robot 100 to avoid obstacles and clutter while treating the cleaning surface 10. If the robot 100 becomes stuck or entangled during use, the robot controller 150 may direct the wheel modules 120*a*, 120*b* through a series of escape behaviors so that the robot 100 can escape and resume normal cleaning operations.

Figure 12:
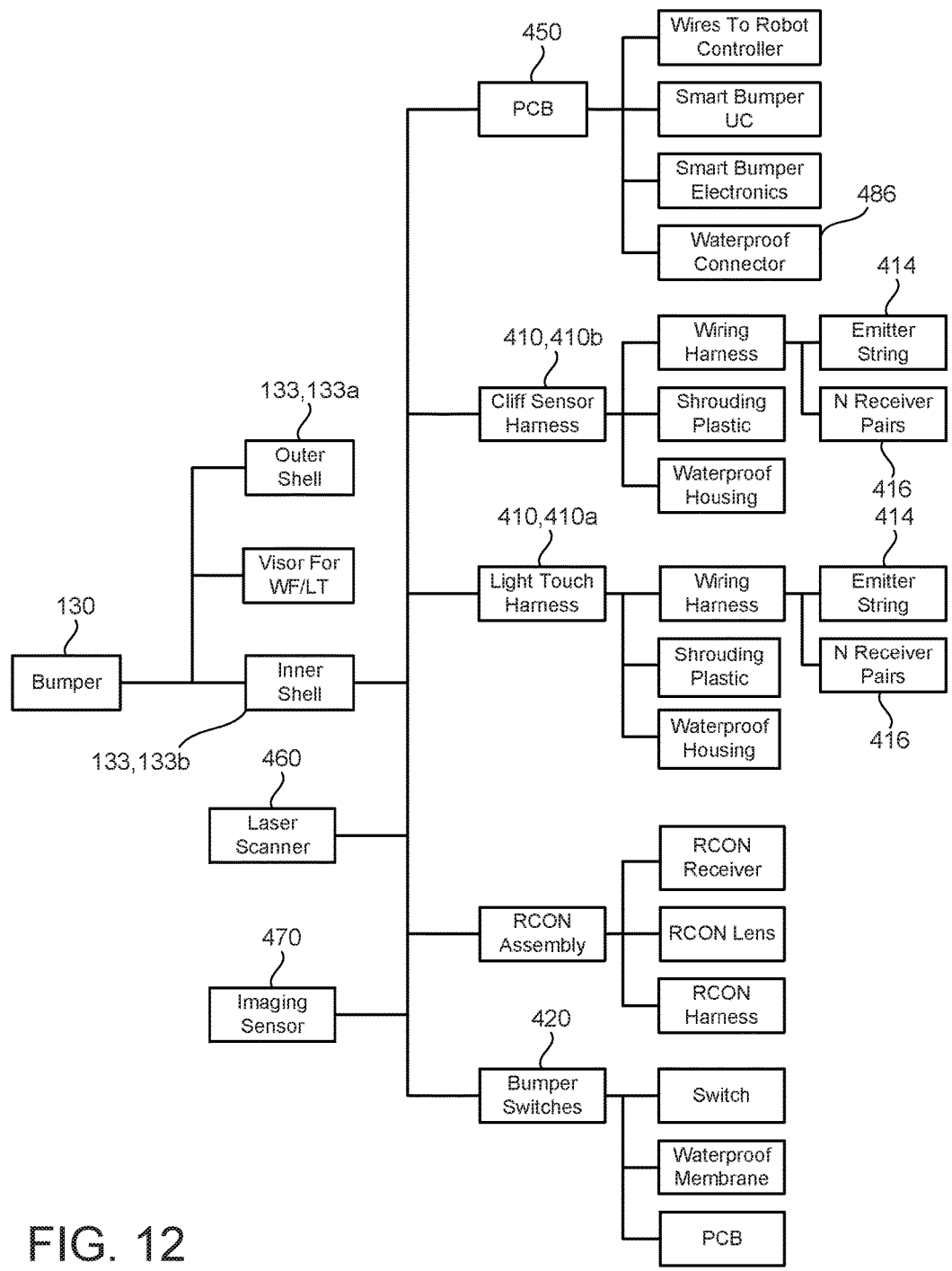
FIG. 12 is a schematic view of a bumper system for a coverage robot.
Figure 13:
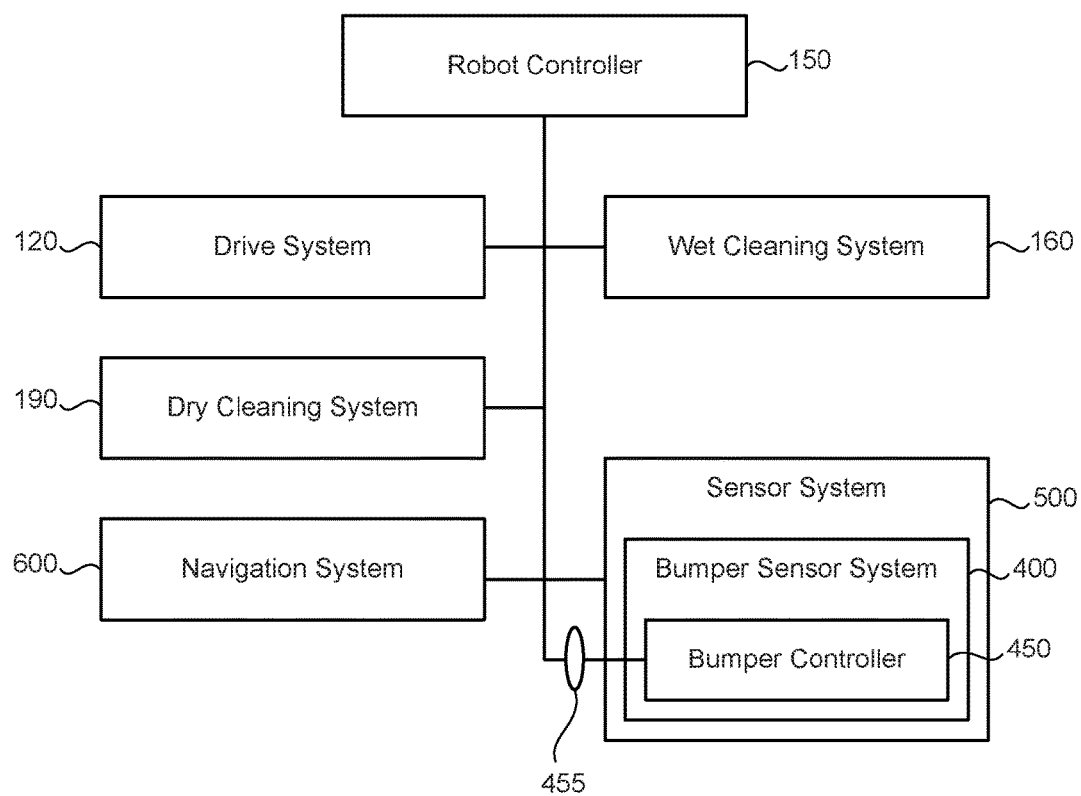
FIG. 13 is schematic view of an exemplary robotic system.

Referring to FIGS. 4, 12 and 13, to achieve reliable and robust autonomous movement, the robot 100 may include a sensor system 500 having several different types of sensors which can be used in conjunction with one another to create a perception of the robot's environment sufficient to allow the robot 100 to make intelligent decisions about actions to take in that environment. The sensor system 500 may include one or more types of sensors supported by the robot body 110, which may include obstacle detection obstacle avoidance (ODOA) sensors, communication sensors, navigation sensors, etc. For example, these sensors may include, but not limited to, proximity sensors, contact sensors, a camera (e.g., volumetric point cloud imaging, three-dimensional (3D) imaging or depth map sensors, visible light camera and/or infrared camera), sonar, radar, LIDAR (Light Detection And Ranging, which can entail optical auxiliary sensing that measures properties of scattered light to find range and/or other information of a distant target), LADAR (Laser Detection and Ranging), etc. In some implementations, the sensor system 500 includes ranging sonar sensors, proximity cliff detectors, contact sensors, a laser scanner, and/or an imaging sonar.

There are several challenges involved in placing sensors on a robotic platform. First, the sensors need to be placed such that they have maximum coverage of areas of interest around the robot 100. Second, the sensors may need to be placed in such a way that the robot 100 itself causes an absolute minimum of occlusion to the sensors; in essence, the sensors cannot be placed such that they are "blinded" by the robot itself. Third, the placement and mounting of the sensors should not be intrusive to the rest of the industrial design of the platform. In terms of aesthetics, it can be assumed that a robot with sensors mounted inconspicuously is more "attractive" than otherwise. In terms of utility, sensors should be mounted in a manner so as not to interfere with normal robot operation (snagging on obstacles, etc.).

In some implementations, the sensor system 500 includes the obstacle sensor system 400, which may have one or more proximity sensors 410 and bump or contact sensor 420 in communication with the robot controller 150 and arranged in one or more zones or portions of the robot 100 (e.g., disposed around a perimeter of the robot body 110) for detecting any nearby or intruding obstacles. The proximity sensors may be converging infrared (IR) emitter-sensor elements, sonar sensors, ultrasonic sensors, and/or imaging sensors (e.g., 3D depth map image sensors) that provide a signal to the controller 150 when an object is within a given range of the robot 100. Moreover, one or more of the proximity sensors 410 can be arranged to detect when the robot 100 has encountered a falling edge of the floor, such as when it encounters a set of stairs. For example, a cliff proximity sensor 410*b* can be located at or near the leading end and the trailing end of the robot body 110. The robot controller 150 (executing a control system) may execute behaviors that cause the robot 100 to take an action, such as changing its direction of travel, when an edge is detected.

The sensor system 500 may include a laser scanner 460 (FIG. 12) mounted on a forward portion of the robot body 110 (e.g., having a field of view along the forward drive direction F) and in communication with the robot controller 150. In the example shown in FIGS. 4 and 6, the laser scanner 460 is mounted on the bumper 130 as part of the obstacle sensor system 400. Having the laser scanner 460 on the bumper 130 behind a shroud allows a forward field of view while reducing snagging on obstacles as compared to an external mounting on top of the robot 100. The laser scanner 460 may scan an area about the robot 100 and the robot controller 150, using signals received from the laser scanner 460, may create an environment map or object map of the scanned area. The robot controller 150 may use the object map for navigation, obstacle detection, and obstacle avoidance. Moreover, the robot controller 150 may use sensory inputs from other sensors of the sensor system 500 for creating object map and/or for navigation.

In some examples, the laser scanner 460 is a scanning LIDAR, which may use a laser that quickly scans an area in one dimension, as a "main" scan line, and a time-of-flight imaging element that uses a phase difference or similar technique to assign a depth to each pixel generated in the line (returning a two dimensional depth line in the plane of scanning). In order to generate a three dimensional map, the LIDAR can perform an "auxiliary" scan in a second direction (for example, by "nodding" the scanner). This mechanical scanning technique can be complemented, if not supplemented, by technologies such as the "Flash" LIDAR/LADAR and "Swiss Ranger" type focal plane imaging element sensors, techniques which use semiconductor stacks to permit time of flight calculations for a full 2-D matrix of pixels to provide a depth at each pixel, or even a series of depths at each pixel (with an encoded illuminator or illuminating laser).

The sensor system 500 may include one or more three-dimensional (3-D) image sensors 470 (e.g., a volumetric point cloud imaging device) mounted on the robot body 110 or bumper 130 and in communication with the robot controller 150. In the example shown in FIGS. 6 and 9, the 3-D image sensor is mounted on the bumper 130 with a forward field of view. If the 3-D image sensor 470 has a limited field of view, the robot controller 150 or the sensor system 500 may, in some implementations, actuate the 3-D image sensor in a side-to-side scanning manner to create a relatively wider field of view to perform robust ODOA.

In some implementations, the sensor system 500 includes an inertial measurement unit (IMU) 510 (FIG. 4) in communication with the robot controller 150 to measure and monitor a moment of inertia of the robot 100. The robot controller 150 may monitor any deviation in feedback from the IMU 510 from a threshold signal corresponding to normal unencumbered operation. For example, if the robot 100 begins to fall over a cliff, is lifted off the floor 10 or is otherwise impeded, the robot controller 150 may determine it necessary to take urgent action (including, but not limited to, evasive maneuvers, recalibration, and/or issuing an audio/visual warning) in order to assure safe operation of the robot 100.

Figure 14:
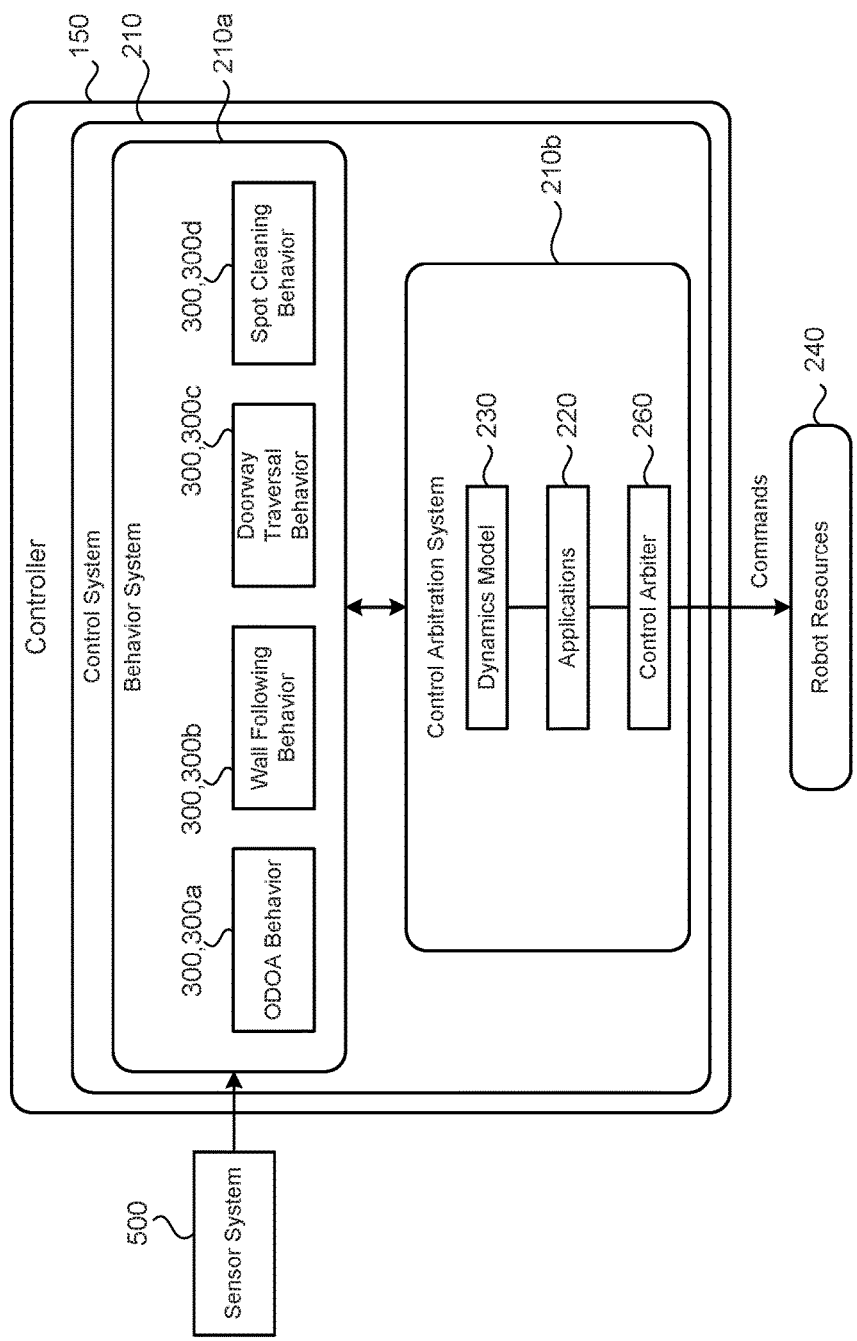
FIG. 14 is a schematic view of an exemplary robot control system.

Referring to FIGS. 13 and 14, in some implementations, the robot 100 includes a navigation system 600 configured to allow the robot 100 to deposit cleaning liquid on a surface and subsequently return to collect the cleaning liquid from the surface through multiple passes. As compared to a single-pass configuration, the multi-pass configuration allows cleaning liquid to be left on the surface for a longer period of time while the robot 100 travels at a higher rate of speed. The navigation system allows the robot 100 to return to positions where the cleaning fluid has been deposited on the surface but not yet collected. The navigation system can maneuver the robot 100 in a pseudo-random pattern across the floor surface 10 such that the robot 100 is likely to return to the portion of the floor surface 10 upon which cleaning fluid has remained.

The navigation system 600 may be a behavior based system stored and/or executed on the robot controller 150. The navigation system 600 may communicate with the sensor system 500 to determine and issue drive commands to the drive system 120.

Referring to FIG. 14, in some implementations, the controller 150 (e.g., a device having one or more computing processors in communication with memory capable of storing instructions executable on the computing processor(s)) executes a control system 210, which includes a behavior system 210a and a control arbitration system 210b in communication with each other. The control arbitration system 210b allows robot applications 220 to be dynamically added and removed from the control system 210, and facilitates allowing applications 220 to each control the robot 100 without needing to know about any other applications 220. In other words, the control arbitration system 210b provides a simple prioritized control mechanism between applications 220 and resources 240 of the robot 100.

The applications 220 can be stored in memory of or communicated to the robot 100, to run concurrently on (e.g., on a processor) and simultaneously control the robot 100. The applications 220 may access behaviors 300 of the behavior system 210a. The independently deployed applications 220 are combined dynamically at runtime and to share robot resources 240 (e.g., drive system 120 and/or cleaning systems 160, 190). A low-level policy is implemented for dynamically sharing the robot resources 240 among the applications 220 at run-time. The policy determines which application 220 has control of the robot resources 240 as required by that application 220 (e.g. a priority hierarchy among the applications 220). Applications 220 can start and stop dynamically and run completely independently of each other. The control system 210 also allows for complex behaviors 300 which can be combined together to assist each other.

The control arbitration system 210b includes one or more application(s) 220 in communication with a control arbiter 260. The control arbitration system 210b may include components that provide an interface to the control arbitration system 210b for the applications 220. Such components may abstract and encapsulate away the complexities of authentication, distributed resource control arbiters, command buffering, coordinate the prioritization of the applications 220 and the like. The control arbiter 260 receives commands from every application 220 generates a single command based on the applications' priorities and publishes it for its associated resources 240. The control arbiter 260 receives state feedback from its associated resources 240 and may send it back up to the applications 220. The robot resources 240 may be a network of functional modules (e.g., actuators, drive systems, and groups thereof) with one or more hardware controllers. The commands of the control arbiter 260 are specific to the resource 240 to carry out specific actions. A dynamics model 230 executable on the controller 150 is configured to compute the center for gravity (CG), moments of inertia, and cross products of inertial of various portions of the robot 100 for the assessing a current robot state.

In some implementations, a behavior 300 is a plug-in component that provides a hierarchical, state-full evaluation function that couples sensory feedback from multiple sources, such as the sensor system 500, with a-priori limits and information into evaluation feedback on the allowable actions of the robot 100. Since the behaviors 300 are pluggable into the application 220 (e.g. residing inside or outside of the application 220), they can be removed and added without having to modify the application 220 or any other part of the control system 210. Each behavior 300 is a standalone policy. To make behaviors 300 more powerful, it is possible to attach the output of multiple behaviors 300 together into the input of another so that you can have complex combination functions. The behaviors 300 are intended to implement manageable portions of the total cognizance of the robot 100.

In the example shown, the behavior system 210a includes an obstacle detection/obstacle avoidance (ODOA) behavior 300a for determining responsive robot actions based on obstacles perceived by the sensor (e.g., turn away; turn around; stop before the obstacle, etc.). Another behavior 300 may include a wall following behavior 300b for driving adjacent a detected wall (e.g., in a wiggle pattern of driving toward and away from the wall). Another behavior 300 may include a doorway traversal behavior 300c for detecting a doorway between adjacent rooms and migrating between the two rooms. A spot cleaning behavior 300d may cause the robot 100 to drive in a spiraling pattern about a location detected as having a threshold level of dirt, fluid or debris.

Figure 15:
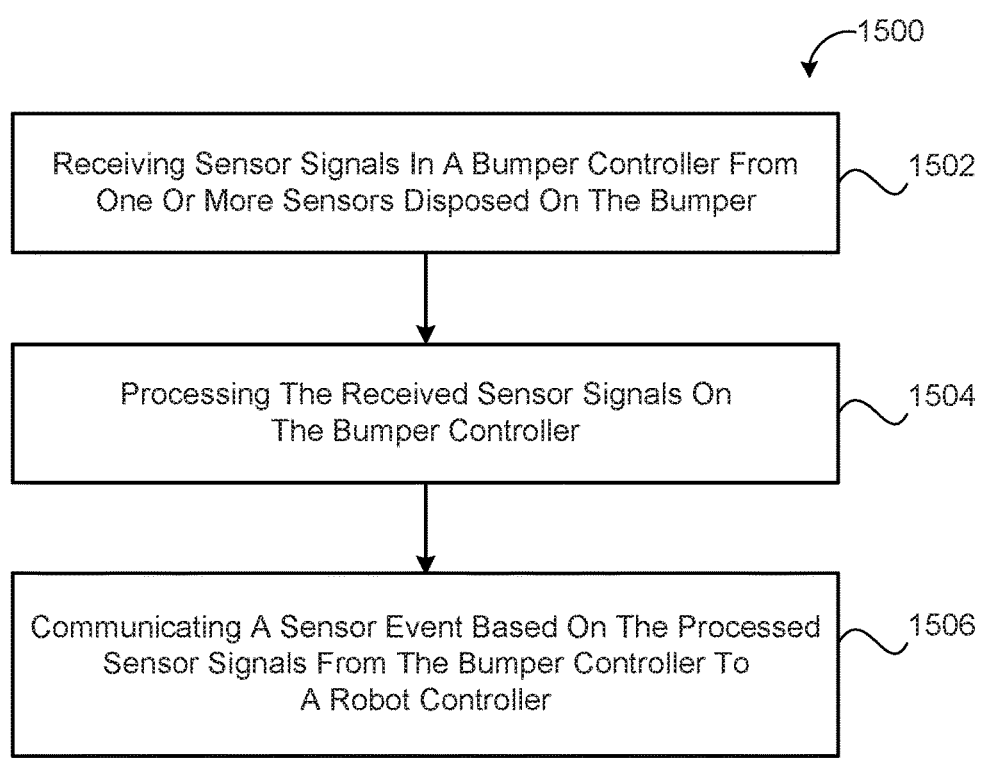
FIG. 15 provides an exemplary arrangement of operations for a method of operating a mobile robot.

FIG. 15 provides an exemplary arrangement of operations for a method 1500 of operating a mobile robot 100 having a bumper 130. The method includes receiving 1502 sensor signals in a bumper controller 450, or auxiliary circuit board, from one or more sensors 410, 420, 430 disposed on the bumper 130, processing 1504 the received sensor signals on the auxiliary circuit board 450, and communicating 1506 a sensor event based on the processed sensor signals from the auxiliary circuit board 450 to the robot controller 150.

In some implementations, the method includes receiving sensor signals from at least one of a contact sensor 420 disposed on the bumper 130, a proximity sensor 410 disposed on the bumper 130, or a camera 470 disposed on the bumper 130. The processing of the received sensor signals may include at least one of analog-to-digital conversion, signal filtering, or signal conditioning. The method may include communicating the sensor event from the auxiliary circuit board 450 to the robot controller 150 over a single communication pathway 480, 486, which may be sealed against fluid infiltration. In some examples, the communication pathway 480 is a single multi-channel line 480 and/or a connector 486 of the bumper 130.

The method may include executing a mapping routing on the robot controller 150 in response to the received sensor event from the auxiliary circuit board 450 for determining a local sensory perception of an environment about the robot 100. The mapping routine may classify the local perceptual space into three categories: obstacles, unknown, and known free. Obstacles may be observed (i.e., sensed) points above the ground that are below a height of the robot 100 and observed points below the ground (e.g., holes, steps down, etc.). Known free corresponds to areas where the sensor system 500 can identify the ground. Data from all sensors in the sensor system 500 can be combined into a discretized 3-D voxel grid. The 3-D grid can then be analyzed and converted into a 2-D grid with the three local perceptual space classifications. The information in the 3-D voxel grid may have persistence, but decays over time if it is not reinforced. When the robot 100 is moving, it has more known free area to navigate in because of persistence. The method may include issuing a drive command from the robot controller 150 to the drive system 120 based on a result of the executed mapping routine.

In some examples, the method includes executing a control system 210 on the robot controller 150. The control system 210 includes a control arbitration system 210b and a behavior system 210a in communication with each other. The behavior system 210a executes at least one behavior 300 that influences execution of commands by the control arbitration system 210b based on sensor events received from the auxiliary circuit board 450. Moreover, the at least one behavior 300 may influence execution of commands by the control arbitration system 210b based on sensor signals received from the robot sensor system 500.

A number of implementations have been described. Nevertheless, it will be understood that various modifications may be made without departing from the spirit and scope of the disclosure. Accordingly, other implementations are within the scope of the following claims.

What is claimed is:

1. A mobile robot comprising:
    a robot body having a forward drive direction;
    a drive system supporting the robot body above a floor surface for maneuvering the robot across the floor surface;
    a main circuit board in communication with the drive system;
    a bumper frame defining a shape complementary of a front periphery of the robot body, the bumper frame supported by the robot body; and
    an obstacle sensor system disposed on the bumper frame, the obstacle sensor system comprising:
        a multiplexing auxiliary circuit board supported by the bumper frame, the multiplexing auxiliary circuit board including a computing processor configured to send a data package representing a received sensor signal to the main circuit board;
        an array of proximity sensors distributed along the bumper frame, the array of proximity sensors comprising:
            an array of wall proximity sensors disposed along a forward perimeter of the bumper frame, each wall proximity sensor directed outward substantially parallel to the floor surface; and
        a communication line connecting the auxiliary circuit board to the main circuit board.

2. The robot of claim 1, wherein at least one proximity sensor comprises a pair of converging infrared emitter-sensor elements, a sonar sensor, an ultrasonic sensor, a three-dimensional volumetric point cloud imaging device, or a contact sensor.

3. The robot of claim 1, wherein each proximity sensor comprises:
    an infrared emitter having an emission field; and
    an infrared detector having a detection field;
    wherein the infrared emitter and the infrared detector are arranged so that the emission field overlaps with the detection field.

4. The robot of claim 1, wherein the obstacle sensor system further comprises an array of cliff proximity sensors distributed along the bumper frame and disposed forward of wheels of the drive system, each cliff proximity sensor directed downward at the floor surface for detecting a falling edge of the floor surface.

5. The robot of claim 1, wherein the obstacle sensor system further comprises at least one optical confinement sensor disposed on the bumper frame and having a horizontal field of view of between 45° and 270°.

6. The robot of claim 1, wherein the array of proximity sensors comprises an array of at least four discrete proximity sensors.

7. The robot of claim 1, wherein the array of proximity sensors comprises:
    a first sensor array having three or more proximity sensors of a first sensor type; and
    a second sensor array having three or more sensors of a second sensor type distinct from the first sensor type.

8. The robot of claim 7, wherein the first sensor array is disposed vertically above the second sensor array on the bumper frame with respect to the floor surface.

9. The robot of claim 7, wherein the first sensor array or the second sensor array comprises an array of wall proximity sensors disposed evenly along a forward perimeter of the bumper frame, each wall proximity sensor directed outward substantially parallel to the floor surface.

10. The robot of claim 9, wherein the other sensor array of the first sensor array or the second sensor array comprises an array of cliff proximity sensors distributed along the bumper frame and disposed forward of wheels of the drive system, each cliff proximity sensor directed downward at the floor surface for detecting a falling edge of the floor surface.

11. The robot of claim 1, wherein the computer processor is further configured to perform sensor data processing comprising at least one of analog-to-digital conversion, signal filtering, or signal conditioning.

12. The robot of claim 1, further comprising a bumper body housing and sealing the bumper frame and the obstacle sensor system against fluid infiltration, wherein the bumper body defines an orifice sized to receive the communication line, the communication line having a sealed fit with the orifice.

13. A mobile robot comprising:
    a main circuit board;
    an array of proximity sensors distributed along a front periphery of the mobile robot, each proximity sensor including at least one infrared emitter and at least one infrared detector, each proximity sensor having a sensor length defined between the infrared emitter and the infrared detector of the proximity sensor, a cumulative total of individual sensor lengths in the array is greater than a length of the array taken along the front periphery of the mobile robot, and each proximity sensor in the array corresponding to a predetermined proximity sensor position along the front periphery of the mobile robot;

a multiplexing auxiliary circuit board supported by the front periphery of the mobile robot, the multiplexing auxiliary circuit board including a computing processor configured to send a data package representing a received sensor signal to the main circuit board;

a communication line connecting the auxiliary circuit board to the main circuit board; and wherein at least some of the proximity sensors in the array overlap one another along the front periphery of the mobile robot.

14. The mobile robot of claim 13 wherein at least one proximity sensor comprises a pair of converging infrared emitter-sensor elements, a sonar sensor, an ultrasonic sensor, a three-dimensional volumetric point cloud imaging device, or a contact sensor.

15. The mobile robot of claim 13, wherein each proximity sensor comprises:
an infrared emitter having an emission field; and
an infrared detector having a detection field;
wherein the infrared emitter and the infrared detector are arranged so that the emission field overlaps with the detection field.

16. The mobile robot of claim 13, wherein the array of proximity sensors comprises an array of at least four discrete proximity sensors.

17. The mobile robot of claim 13, wherein the array of proximity sensors comprises:
a first sensor array having three or more proximity sensors of a first sensor type; and
a second sensor array having three or more sensors of a second sensor type distinct from the first sensor type.

18. The mobile robot of claim 17, wherein the first sensor array is disposed vertically above the second sensor array on the bumper frame with respect to a floor surface supporting the robot.

19. A mobile robot comprising:
a main circuit board;
a multiplexing auxiliary circuit board including a computing processor configured to send a data package representing a received sensor signal to the main circuit board;
an array of proximity sensors distributed along a bumper of the mobile robot, each proximity sensor including at least one infrared emitter and at least one infrared detector; and
a communication line connecting the auxiliary circuit board to the main circuit board;
wherein the bumper is a unified encasement including two or more mating concave receptacles, the receptacles mating along a closed rim and sealed along that rim to enclose the array of proximity sensors and the auxiliary circuit board, the unified encasement including the communication line exiting through a single sealed aperture.

20. The mobile robot of claim 19, wherein the single sealed aperture defines an area less than one hundredth of a surface area of the unified encasement defined by the mating concave receptacles.

21. The mobile robot of claim 19, wherein the single sealed aperture is an orifice defining area of less than one square centimeter.

22. The mobile robot of claim 19, wherein a unified encasement defined by the mating concave receptacles has a Japanese Industrial Standard water resistance rating of 3 or more.

23. The mobile robot of claim 19, wherein the unified encasement is made of infrared transparent and visible light-blocking plastic.

24. The mobile robot of claim 19, wherein the main circuit board is disposed on a main body of the robot and the auxiliary circuit board is disposed on a bumper movably connected to the main body.

25. A mobile robot comprising:
a robot body having a forward drive direction;
a drive system supporting the robot body above a floor surface for maneuvering the robot across the floor surface;
a main circuit board in communication with the drive system;
a bumper frame defining a shape complementary of a front periphery of the robot body, the bumper frame supported by the robot body; and
an obstacle sensor system disposed on the bumper frame, the obstacle sensor system comprising:
a multiplexing auxiliary circuit board supported by the bumper frame, the auxiliary circuit board including a computing processor configured to send a data package representing a received sensor signal to the main circuit board; and
an array of proximity sensors distributed along the bumper frame, the array of proximity sensors comprising:
a first sensor array having three or more proximity sensors of a first sensor type; and
a second sensor array having three or more sensors of a second sensor type distinct from the first sensor type, the first sensor array disposed vertically above the second sensor array on the bumper frame with respect to the floor surface; and
a communication line connecting the auxiliary circuit board to the main circuit board.

* * * * *